US006962247B2

(12) United States Patent
Maier et al.

(10) Patent No.: US 6,962,247 B2
(45) Date of Patent: Nov. 8, 2005

(54) CURRENCY PROCESSING SYSTEM WITH FITNESS DETECTION

(75) Inventors: Ken Maier, North Wales, PA (US); Marek Baranowski, Southampton, NY (US); Charles Cummings, Philadelphia, PA (US); John Mikkelsen, Langhorne, PA (US); Brian Muszynski, Bensalem, PA (US); Bo Xu, Blue Bell, PA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 10/997,264

(22) Filed: Nov. 24, 2004

(65) Prior Publication Data

US 2005/0087422 A1 Apr. 28, 2005

Related U.S. Application Data

(62) Division of application No. 10/379,365, filed on Mar. 4, 2003.

(60) Provisional application No. 60/362,177, filed on Mar. 6, 2002.

(51) Int. Cl.[7] .............................. G06K 9/28; G07D 7/20

(52) U.S. Cl. ........................................ 194/207; 382/135

(58) Field of Search ................................. 104/207, 205, 104/206, 302; 250/548, 559.01, 559.04, 559.05, 559.06; 382/108, 112, 135

(56) References Cited

U.S. PATENT DOCUMENTS

| | | | | | |
|---|---|---|---|---|---|
| 4,023,011 | A | * | 5/1977 | Nakajima et al. | 235/478 |
| 4,592,090 | A | * | 5/1986 | Curl et al. | 382/135 |
| 4,710,963 | A | * | 12/1987 | Chapman et al. | 382/112 |
| 5,163,672 | A | | 11/1992 | Mennie | 271/187 |
| 5,207,788 | A | | 5/1993 | Geib | 271/122 |
| 5,295,196 | A | | 3/1994 | Raterman et al. | 382/7 |
| 5,467,405 | A | | 11/1995 | Raterman et al. | 382/135 |
| 5,467,406 | A | | 11/1995 | Graves et al. | 382/135 |
| D369,984 | S | | 5/1996 | Larsen | D10/97 |
| 5,537,615 | A | * | 7/1996 | Kelly | 382/270 |
| 5,633,949 | A | | 5/1997 | Graves et al. | 382/135 |
| 5,640,463 | A | | 6/1997 | Csulits | 382/135 |
| 5,652,802 | A | | 7/1997 | Graves et al. | 382/135 |
| 5,687,963 | A | | 11/1997 | Mennie | 271/119 |
| 5,692,067 | A | | 11/1997 | Raterman et al. | 382/135 |
| 5,704,491 | A | | 1/1998 | Graves | 209/534 |
| 5,724,438 | A | | 3/1998 | Graves | 382/135 |
| 5,751,840 | A | | 5/1998 | Raterman et al. | 382/135 |
| 5,790,693 | A | | 8/1998 | Graves et al. | 382/135 |
| 5,790,697 | A | | 8/1998 | Jones et al. | 382/135 |

(Continued)

FOREIGN PATENT DOCUMENTS

| | | |
|---|---|---|
| WO | WO 91/11778 | 8/1991 |
| WO | WO 92/17394 | 10/1992 |
| WO | WO 93/23824 | 11/1993 |
| WO | WO 95/24691 | 9/1995 |
| WO | WO 96/10800 | 4/1996 |

(Continued)

*Primary Examiner*—Ronald E Walsh
(74) *Attorney, Agent, or Firm*—Jenkins & Gilchrist

(57) ABSTRACT

A currency handling system comprising a fitness detector. The fitness detector comprising a thickness detector, a limpness detector, a soil detector or a combination thereof. The thickness detector comprising an upper roller displaceable in a predetermined arc by a note passing between the upper roller and a lower roller. The limpness detector comprising a single driven crackle roller comprising an elongated central bulge and two outer bulges, wherein the central bulge is in conforming relation to a flexible belt. Sheet metal guides further facilitate note deformation and sound production.

10 Claims, 27 Drawing Sheets

U.S. PATENT DOCUMENTS

| | | | | |
|---|---|---|---|---|
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,940,623 | A | 8/1999 | Watts et al. | 395/712 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,039,645 | A | 3/2000 | Mazur | 453/10 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/136 |
| 6,798,899 | B2 | 9/2004 | Mennie et al. | 271/10.09 |
| 6,810,137 | B2 | 10/2004 | Jones et al. | 382/137 |
| 2001/0015311 | A1 | 8/2001 | Mennie | 194/302 |
| 2001/0035603 | A1 | 11/2001 | Graves et al. | 271/265.01 |
| 2002/0020603 | A1 | 2/2002 | Jones et al. | 194/346 |
| 2002/0056605 | A1 | 5/2002 | Mazur et al. | 194/207 |
| 2002/0085745 | A1 | 7/2002 | Jones et al. | 382/135 |
| 2002/0126885 | A1 | 9/2002 | Mennie et al. | 382/135 |
| 2002/0145035 | A1 | 10/2002 | Jones | 235/379 |
| 2002/0154806 | A1 | 10/2002 | Jones et al. | 282/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2004/0003980 | A1 | 1/2004 | Hallowell et al. | 194/206 |
| 2004/0016621 | A1 | 1/2004 | Jenrick et al. | 235/379 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |

FOREIGN PATENT DOCUMENTS

| | | |
|---|---|---|
| WO | WO 96/36933 | 11/1996 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24052 | 6/1998 |
| WO | WO 98/24067 | 6/1998 |
| WO | WO 98/35323 | 8/1998 |
| WO | WO 98/40839 | 9/1998 |
| WO | WO 98/47100 | 10/1998 |
| WO | WO 98/50892 | 11/1998 |
| WO | WO 98/59323 | 12/1998 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 00/24572 | 5/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 04010367 | 1/2004 |
| WO | WO 04027717 | 4/2004 |
| WO | WO 04/036508 | 4/2004 |
| WO | WO 04/038631 | 5/2004 |
| WO | WO 04/068422 | 8/2004 |

* cited by examiner

CURRENCY PROCESSING SYSTEM WITH FITNESS DETECTION

CROSS REFERENCE TO RELATED APPLICATIONS

This application is a divisional application continued from U.S. patent application Ser. No. 10/379,365, filed Mar. 4, 2003, which claims the benefit of priority from U.S. Provisional Patent Application Ser. No. 60/362,177, filed Mar. 6, 2002 entitled "Currency Processing System With Fitness Detection"; incorporated herein by reference in its entirety.

FIELD OF THE INVENTION

The present invention relates generally to the field of currency handling systems and, more particularly, to methods and devices for determining the fitness of currency bills or other conditions of the bills.

BACKGROUND OF THE INVENTION

A variety of techniques and apparatuses have been used to satisfy the requirements of automated currency processing. As the number of businesses that deal with large quantities of paper currency grow, such as banks, casinos and armored carriers, these businesses are continually requiring not only that their currency be processed more quickly but, also, processed with greater accuracy and with more efficiency.

Commonly, in the processing of currency at a bank, for example, cash deposits are first received and verified by a bank teller. The cash deposit is later sorted according to denomination. Finally, the sorted bills are bundled or strapped in stacks of a predetermined number of bills (often one hundred bills).

Select bills, e.g., old bills are often removed from circulation. Fitness is one factor for determining if a bill should be taken out of circulation.

SUMMARY OF THE INVENTION

An embodiment of the invention is directed to a currency handling device comprising fitness detection capabilities and methods related thereto.

In an embodiment, a currency handling device comprises a thickness detector. The detector comprises a first roller; and a second roller mounted adjacent said first roller, second roller being mounted so as to permit it to move relative to the first roller when a bill passes between the first and second rollers. A roller gear is coupled to and movable with the second roller. A drive gear is coupled to the roller gear and causes the second roller to roll by rotating the drive gear. A sensor is positioned to measure the relative displacement between the first roller and the second roller. And a processor coupled to the sensor and comprising software for determining a thickness associated with the note based on the relative displacement between the first and second rollers.

In another embodiment, a currency handling device comprises a limpness detector. The detector comprises deforming structure having a predetermined shape for deforming a note and complimentary structure conforming to the deforming structure, wherein the note is passed between the deforming structure and the complimentary structure and the predetermined shape causes the note to be deformed about two transverse axes. A microphone is operably positioned to detect noise produced by deforming the note. More generally the currency handling device comprises a limpness detector comprising means for deforming a note about three axes, wherein at least two of the three axes are in parallel relation.

In another embodiment, a currency handling method comprises passing a bill past a scanner and taking a bit-map image of the bill with the scanner. Denomination of the bill is determined based on the bit-map image as is the orientation of the bill. Soil level of the bill is determined based on the bit-map image. For some applications the soil level is determined based on comparing patterns of the bill (via the bit-map image) with predetermined levels to determine if the bill is fit or unfit. If the soil level is determined after the orientation and denomination are determined, only a portion of the bit-map image (and hence only a portion of bill patterns) need be analyzed to determine if a bill is fit or unfit. In alternative embodiments image employed is not limited to a bit-map image but includes other types of known images.

Devices having evaluation and determination capabilities have been generally referred to above as currency handling devices for convenience. Similar devices are also referred to herein as document evaluation devices and the like. And the above summary of the present invention is not intended to represent each embodiment or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings.

Figure 1:
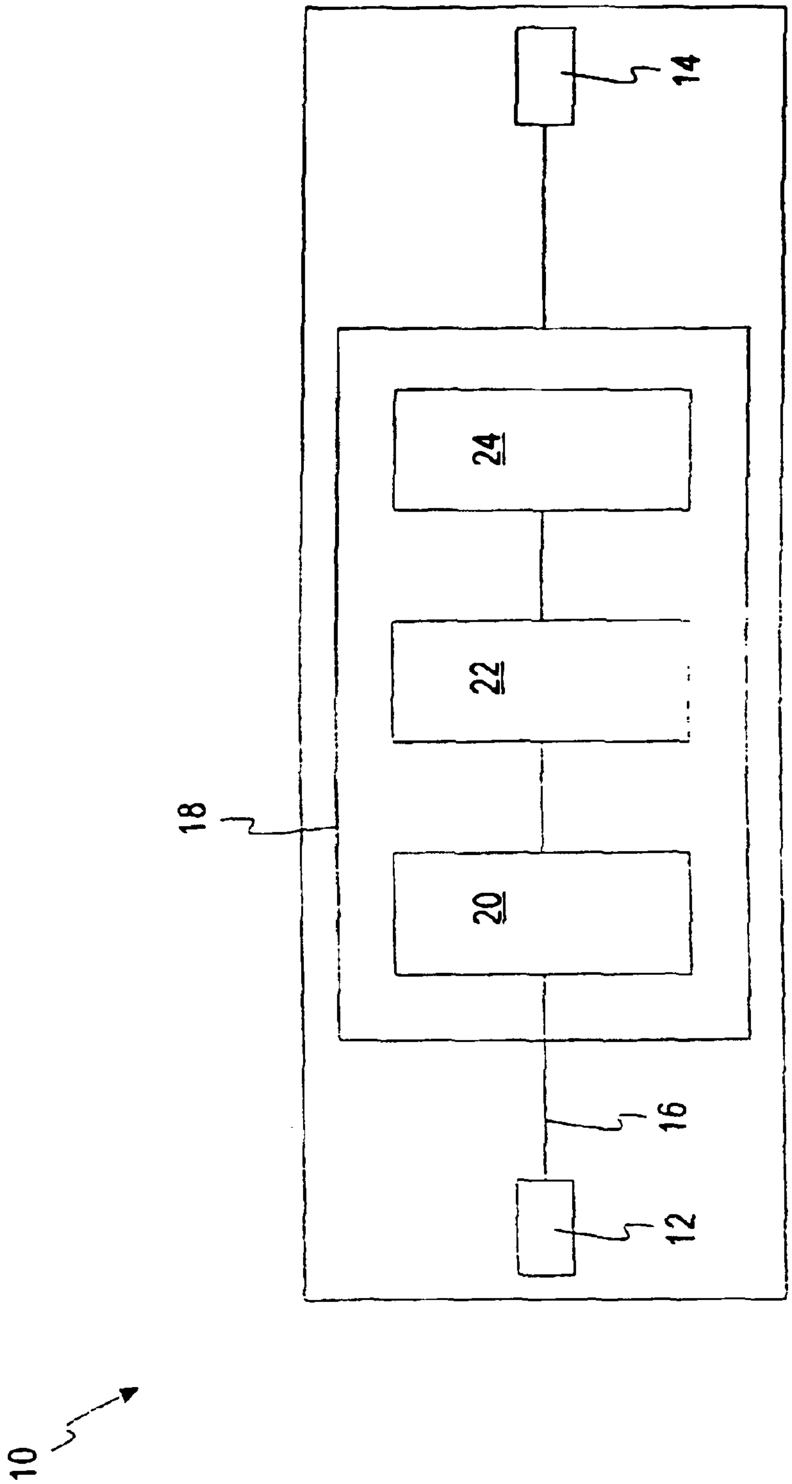
FIG. 1 is a block diagram illustrating a currency processing system comprising a fitness detector according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

FIG. 1 depicts a currency handling system 10, comprising an input receptacle 12 and an output receptacle 14. A transport device or mechanism 16 conveys bills from the input receptacle 12 to the output receptacle 14. A fitness detector 18 is operatively positioned, although not necessarily physically positioned, between the input receptacle 12 and the output receptacle 14. The transport mechanism 16 is adapted to transport one or more bills, including bill bricks, through the fitness detector 18. A fitness detector 18 may be adapted to detect any number of predetermined conditions of the bill including, but not limited to thickness, limpness, dirtiness, holes, tears, tape, staples, paper clips or other criteria for making a determination concerning the bill. Based on the determination concerning the bill, the bill may be taken out of circulation, a counterfeit condition may be determined, a denomination may be determined, etc. In one embodiment a bill is transported past a thickness detector 20 and then a limpness detector 22 followed by transport past a soil detector 24. It will be understood that a fitness detector 18 may comprise one or more of the thickness, limpness or soil detectors or other such condition test detectors, e.g., hole detector, as are appropriate for determining a predetermined criteria.

According to one embodiment of the system 10, the device is a device having a single output receptacle ("single-pocket device"). Examples of single-pocket devices are disclosed in commonly owned U.S. Pat. Nos. 5,295,196; 5,818,892, 5,790,697 and 5,704,491, each of which is incorporated herein by reference in its entirety. In other embodiments of the system 10, the first currency processing device has two output receptacles ("two-pocket device"). Examples of two-pocket devices are disclosed in commonly owned U.S. Pat. Nos. 5,966,456; 6,278,795 B1 and 6,311,819 B1, each of which is incorporated herein by reference in its entirety. U.S. Pat. Nos. 5,966,456 and 6,278,795 also disclose tabletop type two-pocket devices, which can be used in various alternative embodiments of system 10. U.S. Pat. No. 6,311,819 B1, which is incorporated herein by reference in its entirety, also describes additional multiple pocket (multi-pocket) devices such as 3, 4 and 6 pocket devices which can be employed in various alternative embodiments of the system 10. While the system will be described in connection with tabletop-type currency processing devices, other types of currency processing devices, such as floor standing currency processing devices (see e.g., FIGS. 5 and 6), are used in various alternative embodiments of the present invention.

Figure 2:
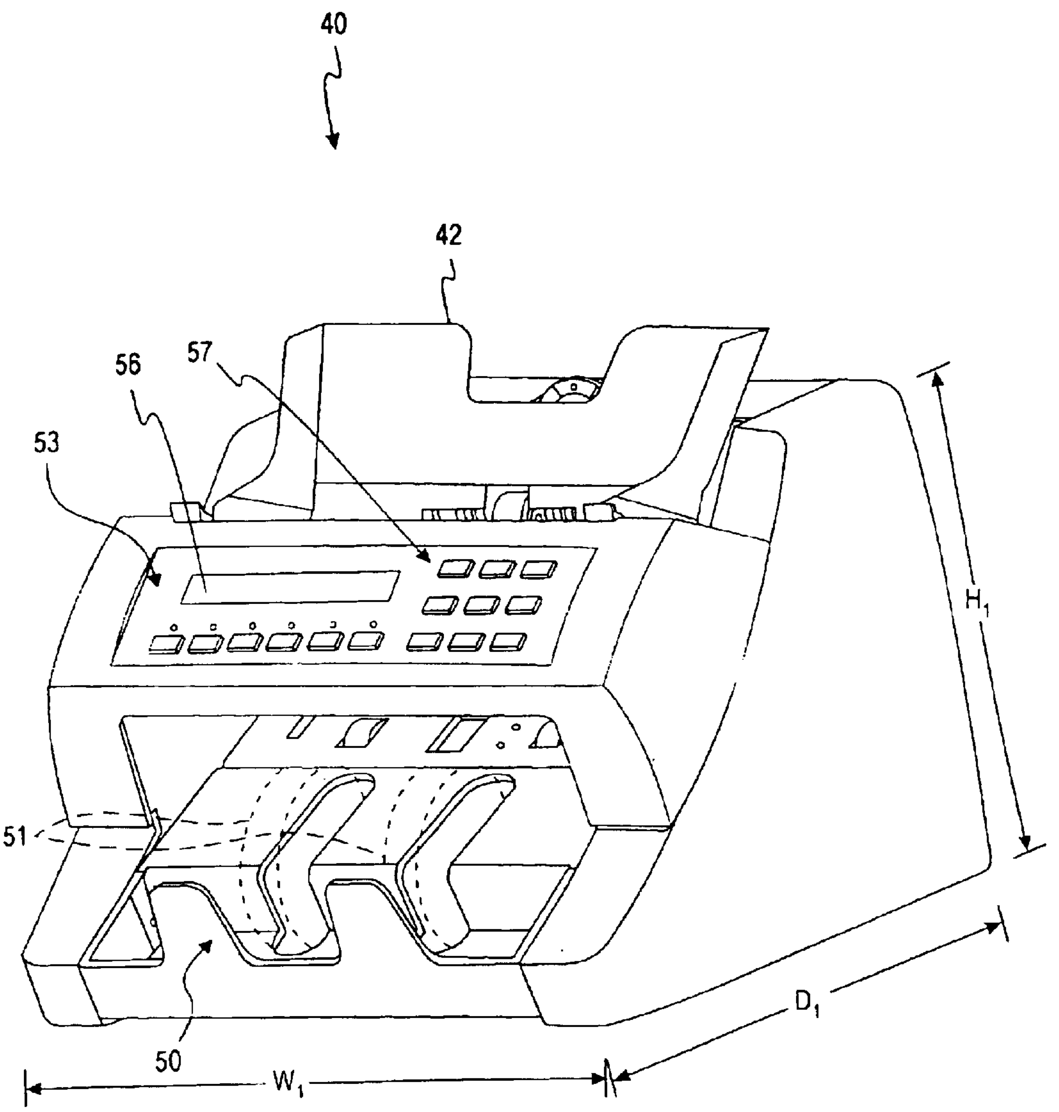
FIG. 2 is a perspective view of a currency processing device having one output receptacle for use with fitness detection.
Figure 3:
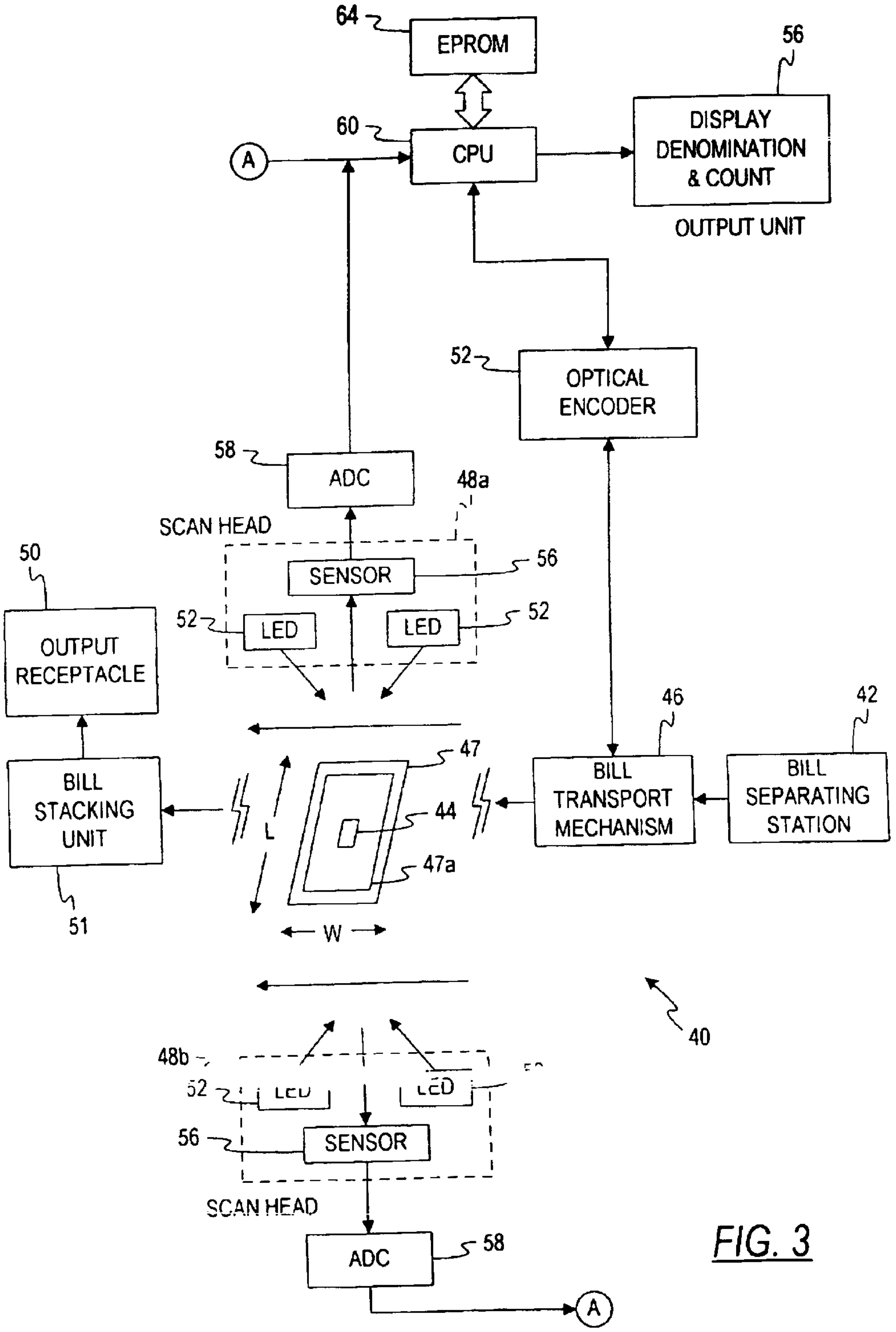
FIG. 3 is a functional block diagram of the device of FIG. 2.

Using a single-pocket device as an example, one example of the operation of a currency handling device will be described. Referring now to FIGS. 2 and 3, there is shown a single-pocket device 40. The device 40 includes an input receptacle 42 for receiving a stack of currency bills to be processed (e.g., counted, denominated, and/or authenticated, etc.). Currency bills in the input receptacle 42 are picked out or separated, one bill at a time, and sequentially relayed by a bill transport mechanism 46, between a pair of scanheads 48*a* and 48*b* where, for example, the currency denomination of each bill is scanned and identified. In the illustrated embodiment, each scanhead 48 is an optical scanhead that scans for optical characteristic information from a scanned bill 47 which is used to identify the denomination of the bill. The scanned bill 47 is then transported to an output receptacle 50, which may include a pair of stacking wheels 51, where bills so processed are stacked for subsequent removal. The device 40 includes an operator interface 53 with a display 56 for communicating information to an operator of the device 40, and buttons 57 for receiving operator input.

In alternative embodiments of the present invention, additional sensors replace or are used in conjunction with the optical scanheads 48*a,b* in the device 40 to analyze, authenticate, denominate count and/or otherwise process currency bills. For example, size detection sensors, magnetic sensors, thread sensors, and/or ultraviolet/fluorescent light sensors may be used in the currency processing device 40 to evaluate currency bills. Uses of these types of sensors for currency evaluation are described in commonly owned U.S. Pat. No. 6,278,795, which is incorporated herein by reference in its entirety. Likewise, one or more embodiments of fitness detectors may be used in addition or in place of the above type sensors.

According to one embodiment of the currency processing device 40, each optical scanhead 48*a,b* comprises a pair of light sources 52, such as light emitting diodes, that direct light onto the bill transport path so as to illuminate a substantially rectangular light strip 44 upon a currency bill 47 positioned on the transport path adjacent the scanhead 48. Light reflected off the illuminated strip 44 is sensed by a photodetector 56 positioned between the two light sources. The analog output of the photodetector 56 is converted into a digital signal by means of an analog-to-digital convertor ("ADC") 58 whose output is fed as a digital input to a processor such as central processing unit (CPU) 60.

According to one embodiment, the bill transport path is defined in such a way that the transport mechanism 46 moves currency bills with the narrow dimension of the bills parallel to the transport path and the scan direction. As a bill 47 traverses the scanheads 48 the light strip 44 effectively scans the bill across the narrow dimension of the bill 47. In the depicted embodiment, the transport path is arranged so that a currency bill 47 is scanned across a central section of the bill along its narrow dimension, as shown in FIG. 3. Each scanhead functions to detect light reflected from the bill 47 as it moves across the illuminated light strip 44 and to provide an analog representation of the variation in reflected light, which, in turn, represents the variation in the dark and light content of the printed pattern or indicia on the surface of the bill 47. This variation in light reflected from the narrow dimension scanning of the bills serves as a measure for distinguishing, with a high degree of confidence, among a plurality of currency denominations that the system is programmed to process.

Additional details of the device 40 illustrated in FIGS. 2 and 3 and processes for using the same are described in U.S. Pat. Nos. 5,295,196 and 5,815,592, each of which is incorporated herein by reference in its entirety.

According to various alternative embodiments, a currency processing devices are capable of processing, including fitness evaluating and denominating the bills, singularly or in combination, from about 800 to over 1500 bills per minute. Furthermore, a multi-functional processor may be programmed to only evaluate fitness, for example, of bills at speeds from about 800 to over 1500 bills per minute. For example, in some embodiments employing one or more of the fitness sensors described below, the transport is adapted to transport bills and bills are processed at a speed in excess of about 800 bills per minute. In other embodiments, employing one or more of the fitness sensors described below, the transport is adapted to transport bills and bills are processed at a speed in excess of about 1000 bills per minute employing one or more of the fitness sensors described below, the transport is adapted to transport bills and bills are processed at a speed in excess of about 1200 bills per minute employing one or more of the fitness sensors described below, the transport is adapted to transport bills and bills are processed at a speed in excess of about 1500 bills per minute. For example, the above described speeds may be obtained using the devices described in connection with FIGS. 1–6 and 20*a*–20*c*.

While the single-pocket device 40 of FIGS. 2 and 3 has been described as a device capable of determining the denomination of processed bill, system 10 may be a note counting device. Note counting devices are disclosed in commonly owned U.S. Pat. Nos. 6,026,175 and 6,012,565 and in commonly owned, co-pending U.S. patent application Ser. No. 09/611,279, filed Jul. 6, 2000, each of which is incorporated herein by reference in its entirety. Note counting devices differ from currency denominating devices in that note counting devices do not denominate the currency bills being processed and are not designed to process and determine the total value of a stack of mixed denomination currency bill. But fitness detection may also be used in note counting devices.

As indicated above, according to one embodiment of the present invention, the single-pocket device 40 of FIG. 2 is compact and designed to be rested on a tabletop. The device 40 of FIG. 2 has a height ($H_1$) of about 9.5 inches (about 24.14 cm), a width ($W_1$) of about 11–15 inches (about 27.94–38.10 cm), and a depth ($D_1$) of about 12–16 inches (about 30.48–40.64 cm), which corresponds to a footprint ranging from about 132 $in^2$ (851 $cm^2$) to about 250 $in^2$ (1613 $cm^2$) and a volume ranging from about 1254 $in^3$ (about 20,549 $cm^3$) to about 2280 $in^3$ (about 37,363 $cm^3$).

Figure 4:
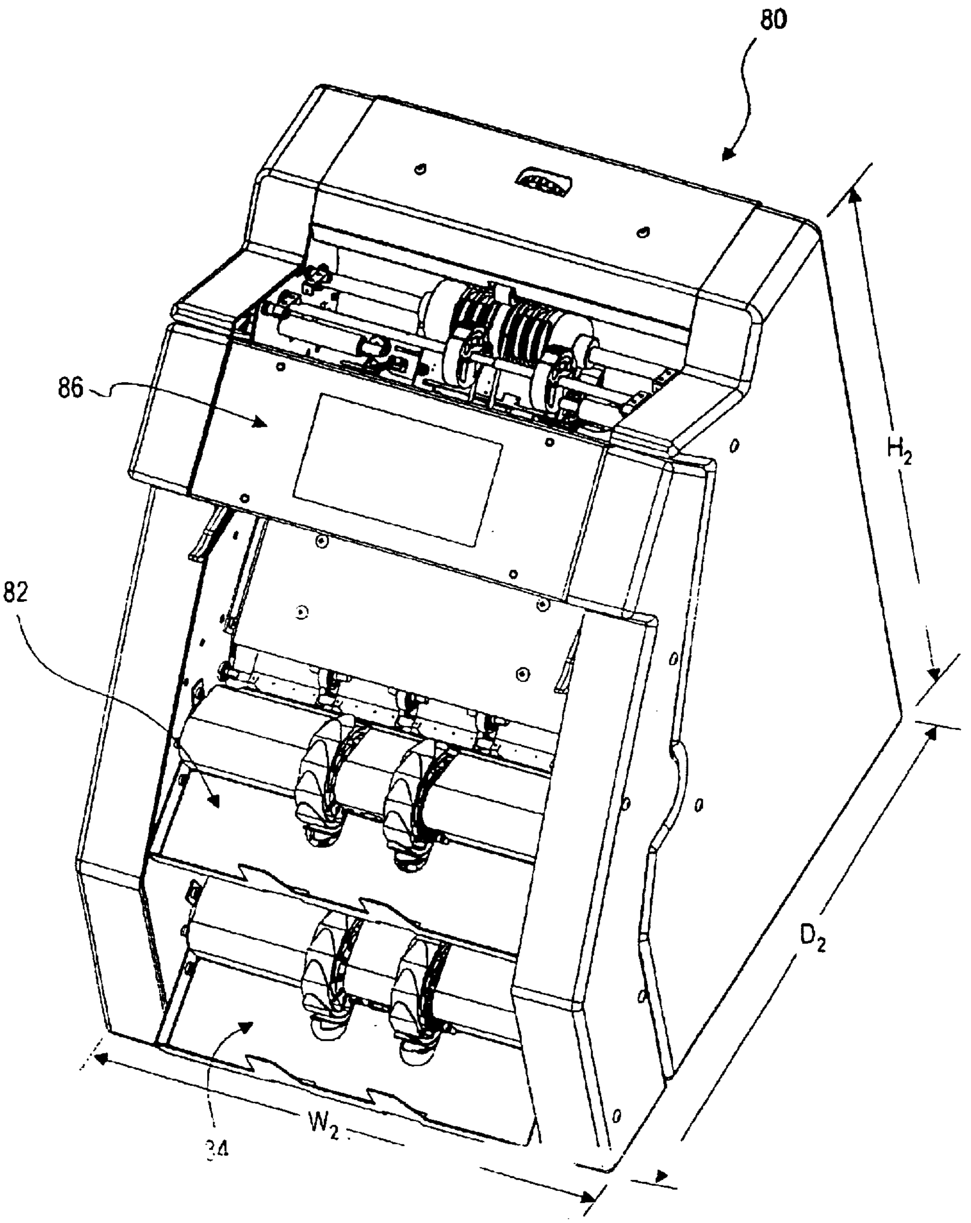
FIG. 4 is a perspective view of a currency processing device having two output receptacles for use with fitness detection.

Referring now to FIG. 4, a currency processing device 80 having two output receptacles ("two-pocket device") is depicted with a first output receptacle 82 and a second output receptacle 84. The two-pocket device 80 includes an operator interface 86 for communicating with an operator of the device 80. Generally, the two-pocket device 80 (FIG. 4) operates in a similar manner to that of the single-pocket device 40 (FIG. 2), except that the transport mechanism of the two-pocket device 80 is adapted to transport the bills to either of the two output receptacles 82, 84. The two output receptacles 82, 84 may be utilized in a variety of fashions according to a particular application. For example, in the processing of currency bills, the bills may be directed to the first output receptacle 82 until a predetermined number of bills have been transported to the first output receptacle 82 (e.g., until the first output receptacle 82 reaches capacity or a strap limit) and then directs subsequent bills to the second output receptacle 84. In another application, all bills are transported to the first output receptacle 82 expect those bills triggering error signals, such as "no call" error signals (i.e., bill whose denomination is not identified), "suspect document" error signals (i.e., bills failing an authentication test) and fit/unfit sorting signals, which are directed to the second output receptacle 84. Further details of the operational and mechanical aspects of the two-pocket device 80 illustrated in FIG. 4 are detailed in commonly owned U.S. Pat. Nos. 5,966,456, 6,278,795 B1 and 6,311,819 B1, each incorporated herein by reference above.

According to one embodiment of the present invention, the two-pocket device 80 illustrated in FIG. 4 is compact having a height ($H_2$) of about 17.5 inches (about 44.5 cm), a width ($W_2$) of about 13.5 inches (about 34.3 cm), and a depth ($D_2$) of about 15 inches (about 38.1 cm) and weighs approximately 35 lbs. (about 16 kg). The two-pocket device 80 is compact and is designed to be rested upon a tabletop. The two-pocket device 80 has a footprint of about 202 $in^2$ (1307 $cm^2$) and occupies a volume of about 3540 $in^3$ (about 58,150 $cm^3$).

Figure 5:
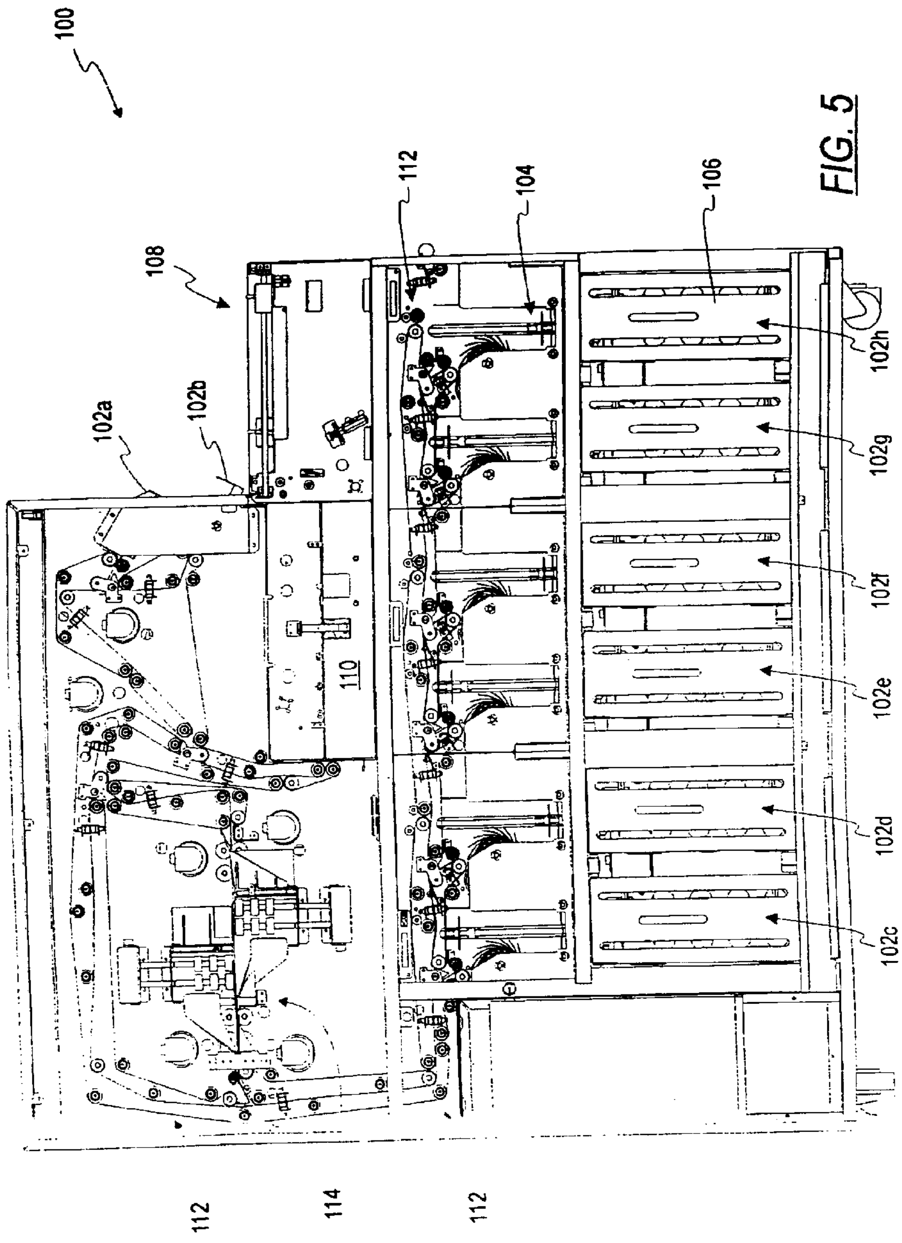
FIG. 5 is a front view of a currency processing device having multiple output receptacles for use with fitness detection.
Figure 6:
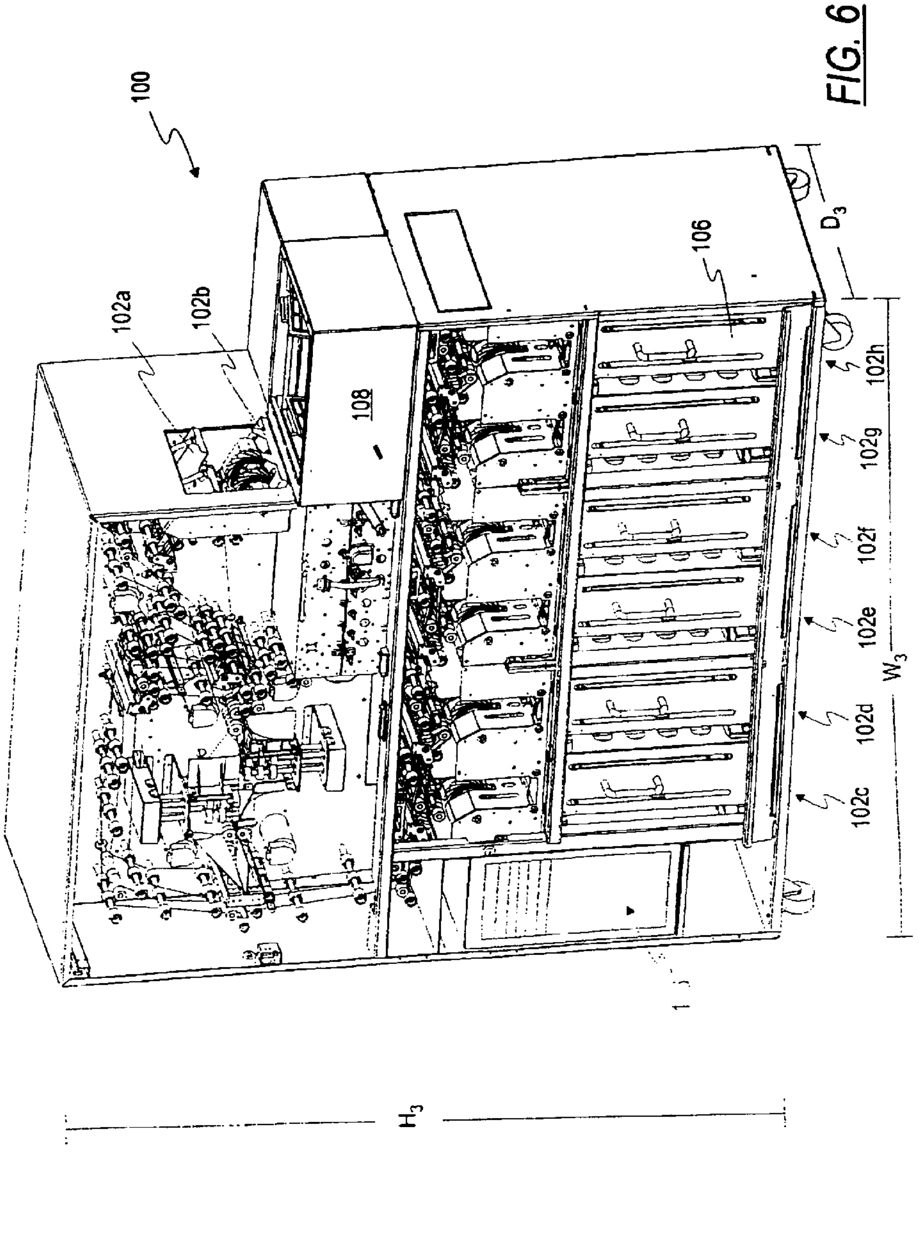
FIG. 6 is a perspective view of the device of FIG. 5.

Referring now to FIGS. 5 and 6, there is shown a currency processing device 100 having a plurality of output receptacles 102*a*–*h* (hereinafter "MPS" for multi-pocket sorter) that is an embodiment of system 10. The MPS illustrated in FIGS. 5 and 6 include eight output receptacles 102*a*–*h*: two upper output receptacles 102*a,b* and six lower output receptacles 102*c*–*h*. Further, modular lower output receptacles (not shown) may be added to the MPS to increase the number of lower output receptacles. Each of the lower output receptacles 102*c–h* includes an escrow region 104 (shown with respect to lower output receptacle 102*h*) for receiving and stacking currency bills and a storage cassette 106 for holding stacks of processed currency bills. Currency bills are transported to a particular one of the escrow regions 104 and are stacked therein. At specified times or on the occurrence of specific events, currency bills stacked in an escrow region 104 may be moved into the corresponding storage cassette 106. According to one embodiment, each storage cassette 106 is capable of holding up to approximately one thousand currency bills. The currency handling device 100 depicted in FIG. 6 has a width $W_3$, of approximately 4.52 feet (1.38 meters), a height $H_3$, of approximately 4.75 feet (1.45 meters) and a depth $D_3$, of approximately 1.67 feet (0.50 meters).

According to an alternative embodiment of the present invention, the tvPS shown in FIG. 5 may be embodied in one or more table-top versions. Generally, a table-top version of the MPS operates in a manner similar to that of the MPS shown in FIG. 5. In a table-top version the lower output receptacles generally do not include the storage cassettes 106; rather, the escrow regions 104 make up the lower output receptacles 102*c–h*. Therefore, the overall height of the machine is reduced. For more detail concerning such processors, refer to U.S. Ser. No. 09/502,666 (Currency Handling System Having Multiple Output Receptacles), filed Feb. 11, 2000, and which is incorporated herein by reference in its entirety.

The MPS is capable of sorting bills according to denomination into each of the output receptacles. Using United States currency bills as an example, a stack of mixed currency bills is received in an input receptacle 108. In other embodiments of the present invention, the MPS is capable of authenticating currency bills. Currency bills are transported, one at a time, from the input receptacle 108 through an evaluation region 110 by a transport mechanism 112 to the plurality of output receptacles 102*a–h*. In sorting the bills, the evaluation region 110 identifies the denomination of each of the currency bills and the transport mechanism delivers each bill to a particular one of the lower output receptacles 106*c–h* according to denomination (e.g., U.S. $1 bills into lower output receptacle 106*c*, U.S. $5 bills into lower output receptacle 106*d*, etc.), while bills triggering error signals, such as no call or suspect document error signals, are off-sorted to upper output receptacles 102*a,b*. Numerous other operational alternatives are available to an operator of the MPS, including fit/unfit sorting. For example, the first upper output receptacle 102*a* can be used to receive bills triggering no call error signals and the second upper output receptacle 102*b* can be used to receive bills triggering suspect document error signals. Many other alternative operation modes and examples thereof are disclosed in commonly-owned, co-pending U.S. patent application Ser. Nos. 09/502,666 (filed Feb. 11, 2000) and 09/635,181 (filed Aug. 09, 2000), each of which is incorporated herein by reference in its entirety.

In some embodiments, the MPS includes a bill facing mechanism 114, interposed in the transport mechanism 112, intermediate the bill evaluation region 110 and the lower output receptacles 102*c–h* that is capable of rotating a bill approximately 180° so that the face orientation of the bill is reversed. The leading edge of the bill (the wide dimension of the bill according to one embodiment) remains constant while the bill is rotated approximately 180° about an axis parallel to the narrow dimension of the bill) so that the face orientation of the bill is reversed. Further details of the operational and mechanical aspects a bill facing mechanism for use in the MPS 100 are disclosed in commonly owned U.S. Pat. No. 6,074,334 and co-pending U.S. patent application Ser. No. 09/503,039, each of which is incorporated herein by reference in its entirety.

Various fitness detectors for use with currency handling devices, e.g., those shown in FIGS. 2–6 and 20*a*–20*c* and variations thereof as well as other compatible devices that will be apparent to those of skill in the art, will now be discussed.

Thickness Detection

Figure 7A:
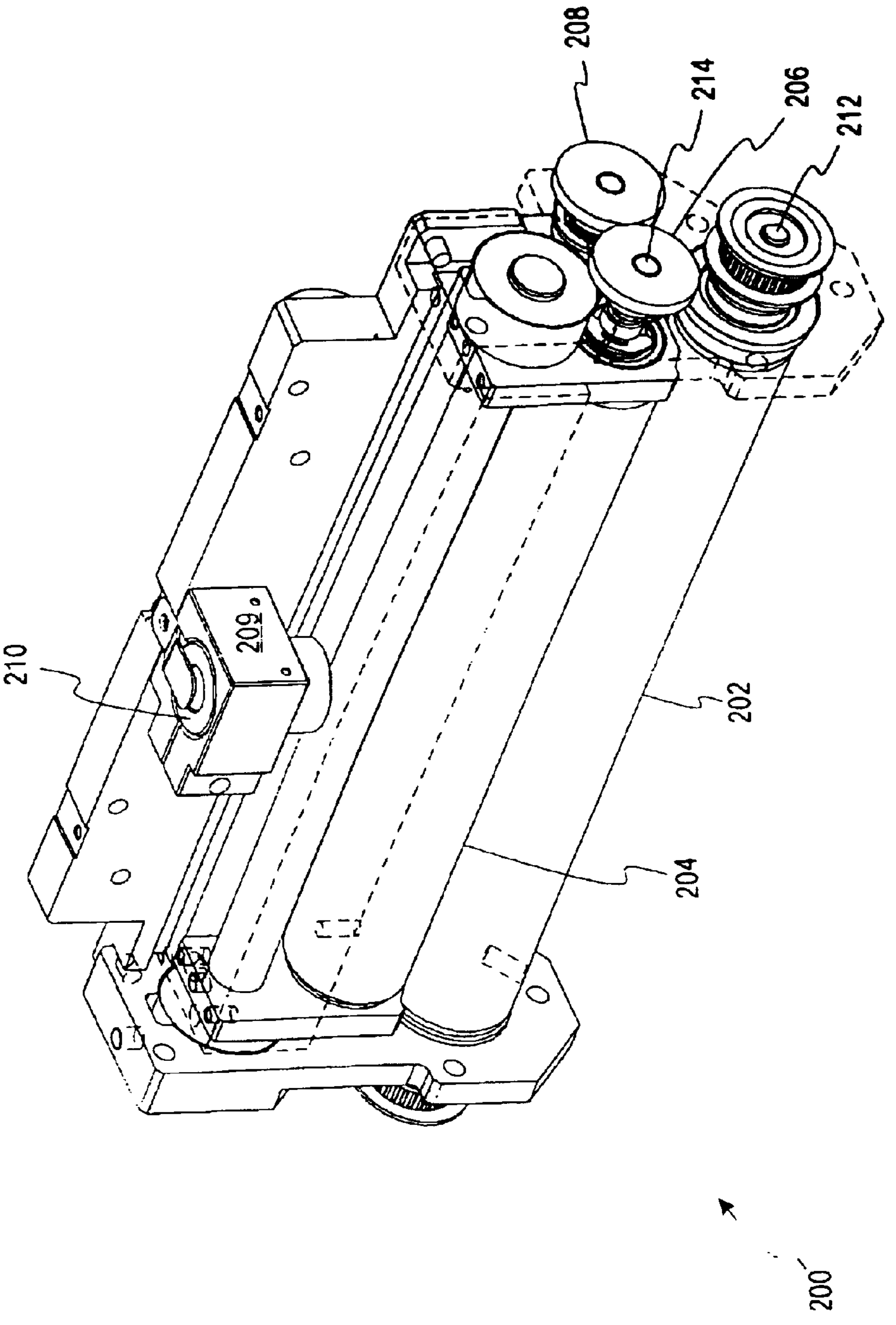
FIG. 7*a* shows a front perspective view of a thickness detector.

FIG. 7*a* depicts a front perspective view of a thickness detector 200 for use in a currency-handling device 10. Thickness detector 200 comprises a first roller 202 and a second roller 204. The second roller 204 is positioned and displaceable relative to the first roller 202 along a predetermined path (not shown) in response to a note (bill, certificate, sheet, etc.) being passed between the first roller 202 and the second roller 204. Note 205 is shown entering the detector 200 in FIG. 7*b* to pass between the lower roller 202 and the upper roller 204. The concept of upper and lower is merely used for convenience and is not intended to imply the thickness detector must be positioned in a particular orientation. In the embodiment depicted in FIG. 7*a*, the first roller 202 is a lower roller and the second roller 204 is an upper roller. A roller gear 206 is coupled to and movable with the second roller 204. A drive gear 208 coupled to the roller gear 206 causes the second roller 204 to roll.

A sensor holder 209 holds a sensor 2 10 that is positioned to measure the relative displacement between the first roller 202 and the second roller 204. Exemplary sensors include, but are not limited to, linear voltage differential transducers and optical sensors. For some applications a displacement sensor having a range of 0.050 inch is suitable. A plunger is often used in such sensors, wherein the plunger is displaced in direct relation to the displacement of the upper roller. The displacement measurement need not be in direct relation to displacement of the upper roller. Typically the expected displacement for a typically U.S. bill having a foreign object is from an initial gap of 0.002 inch to 0.008 inch. The thickness of a typical U.S. bill is approximately 0.004 inch and the thickness of typical transparent tape is less than 0.004 inch. Thus a displacement of greater than 0.004 inch and less than 0.008 inch may for example indicate tape. A displacement greater than 0.008 inch may indicate a double bill.

A processor (not shown) is coupled to the sensor 210. The processor is programmed via software, firmware, or otherwise to determine a thickness associated with the bill based on the relative displacement between the first roller 202 and second roller 204. According to some embodiments, the sensor generates a displacement signal and the processor receives the displacement signal and determines the thickness of a bill which is associated with the displacement signal. Thickness parameters associated with various objects may be stored in the processor (more specifically, in memory associated with the processor), or in memory coupled to the processor, to facilitate identification of the object. Additionally, output for other sensors may be combined with that of the thickness detector to facilitate or confirm object identification. For example, a thickness detector may indicate a potential fold in the bill. But if an optical sensor does not indicate a darkness reading consistent with a fold, then the object would be identified as something else. Alternatively, the bill could just be identified as unfit, for example.

In the embodiment shown in FIG. 7*a*, the first roller 202 has a central axis 212 that is fixed. The first roller 202 rotates about axis 212. The roller gear 206 shown in FIG. 7*a* is a planetary gear. The second roller 204 has a second roller central axis 214 that is displaceable along the predetermined path. The central axis 214 and the planetary gear 206 move in an arc about the drive gear 208 which is fixed in position, but rotatable. The distance from the center of the planetary gear 206 to the center of the drive gear 208 is on the order of 0.95 inch. But that center-to-center distance varies with the size of the gears. Since the typically expected displacement is less than 0.020 inch for a center-to-center distance of approximately 1.0 inch, the gear size can be determined based on the expected typical maximum displacement. Furthermore, other radius curvatures are acceptable for various applications.

Figure 7B:
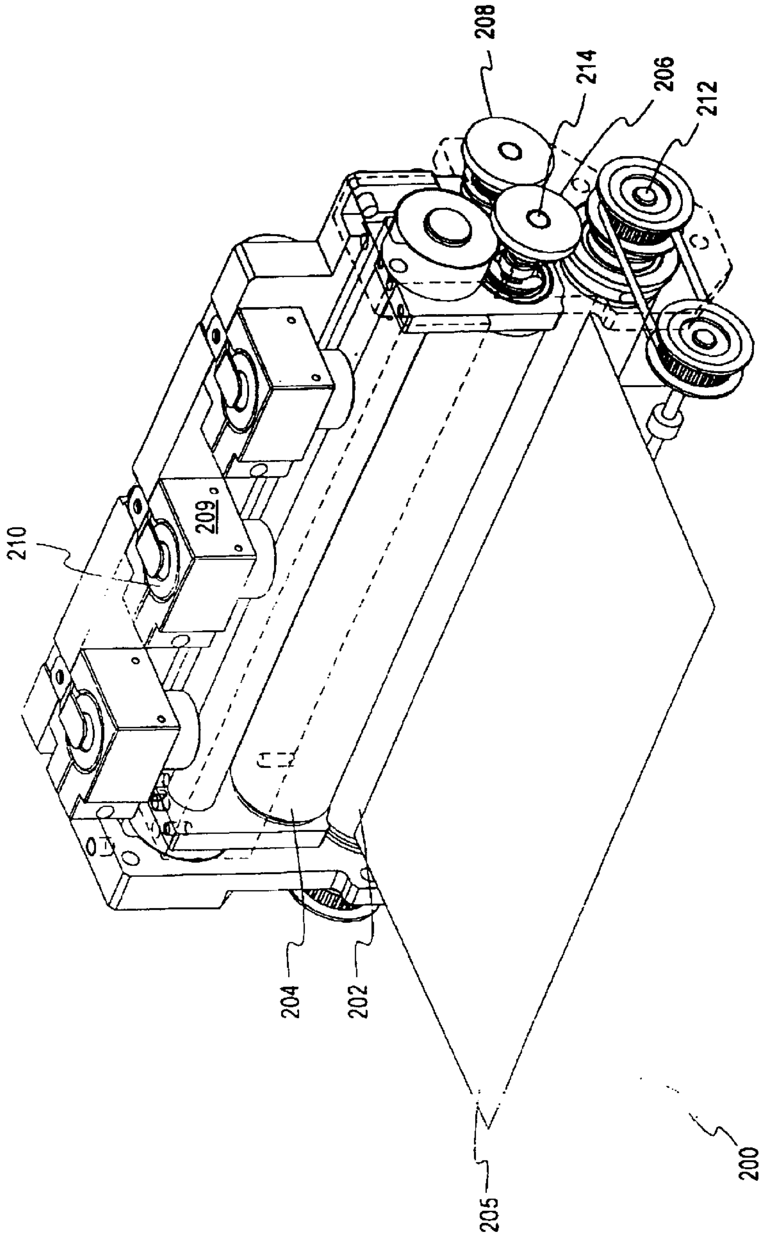
FIG. 7*b* shows a front perspective view of a thickness detector with three sensors.

In some embodiments the sensor 210 comprises a plurality of displacement sensors positioned parallel with the second roller central axis 214 as shown in FIG. 7*b*. The software or firmware, etc. for determining thickness associated with the note may be adapted to comprise auto-zeroing software, firmware, etc. for recording a roller signature for determining baselines. The sensor and processor may be integrated into a displacement sensor. The processor may also include software, firmware, etc. for detecting the presence, size and location of items. Such items include, but are not limited to, tape, staples and security features. Similarly, the processor may be programmed (e.g., via software, firmware, etc.) to detect discontinuities in the notes, e.g., folds, holes, tears, doubles of notes (e.g., where one note substantially overlays another note) and chains of notes (e.g., where one note partially overlaps another note).

The first and second rollers 202 and 204 depicted in FIG. 7*a* are elongated rollers and preferably comprise a ground and hardened stainless steel surface. For some applications, the rollers are full-width rollers and are made of solid stainless steel. The rollers 202 and 204 depicted in FIGS. 7*a* and 7*b* are approximately 8.5 inches long to accommodate a large variety of bill widths. The lower roller 202 is fixed and belt driven, whereas the upper roller 204 is driven by the fixed gear 208 coupled to the planetary gear 206. Although it is not required to drive both rollers, for high speed applications it is desirable to drive both rollers at essentially the same speed.

Figure 8:
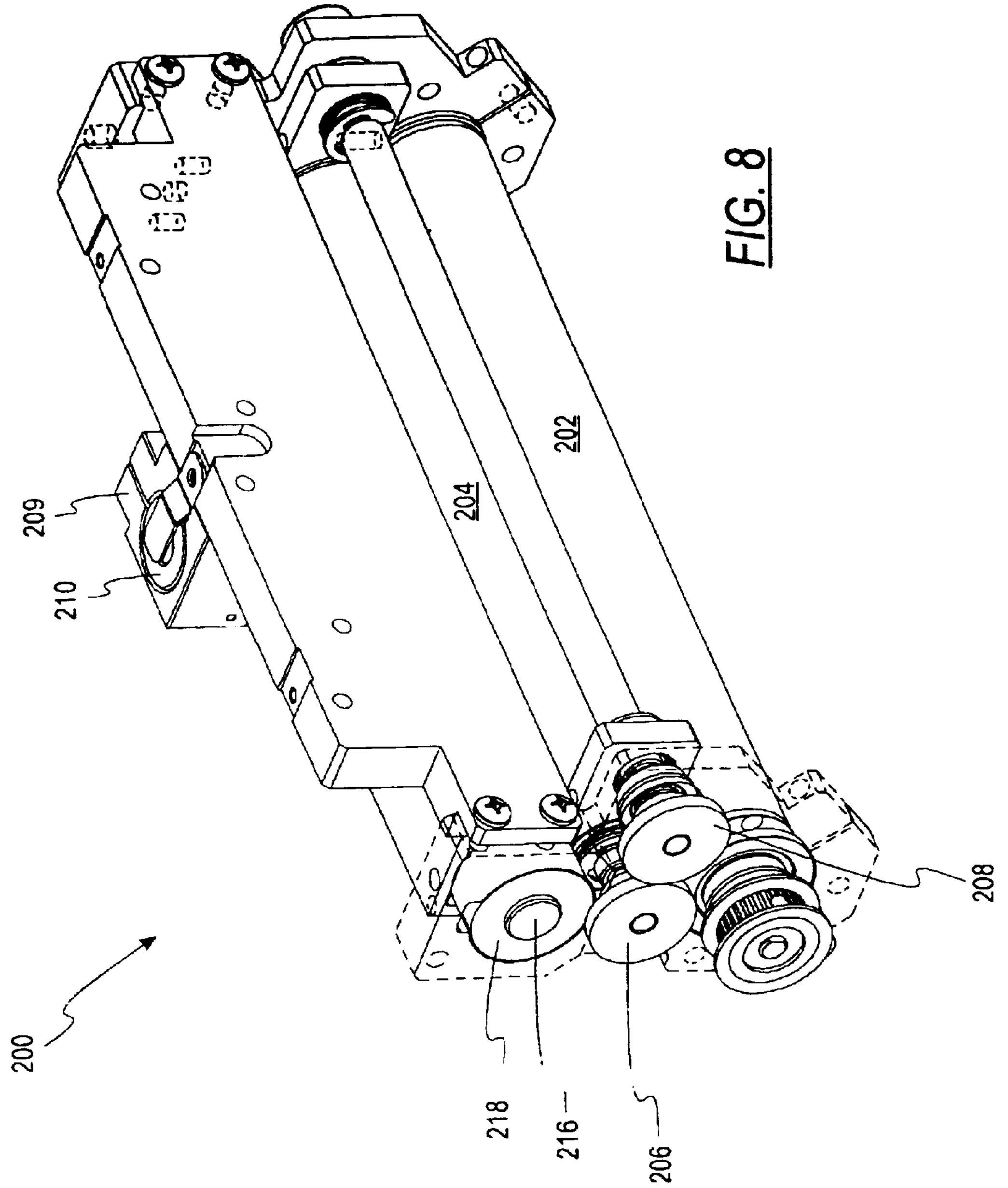
FIG. 8 depicts a rear perspective view of the thickness detector shown in FIG. 7*a*.
Figure 9A:
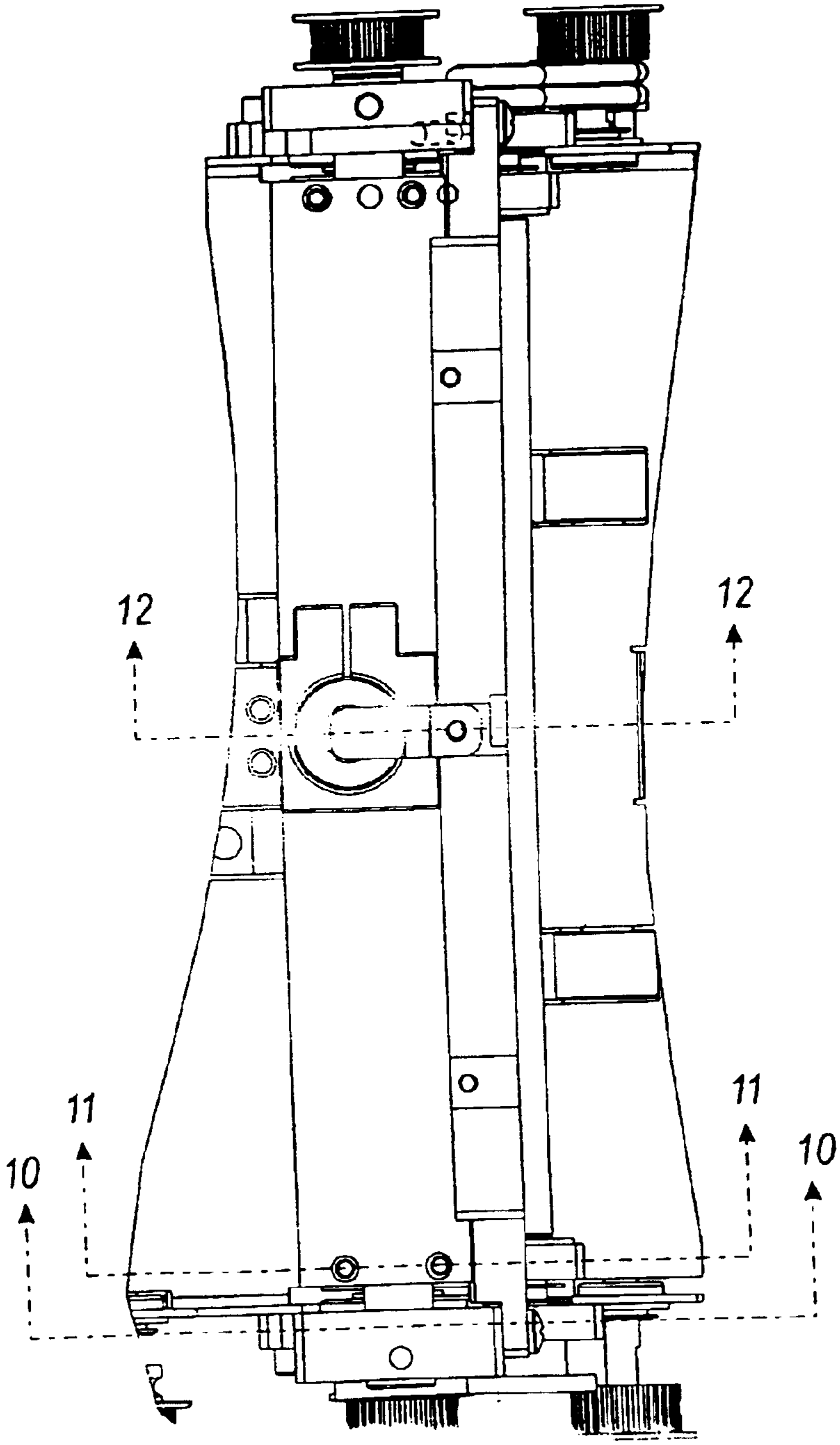
FIG. 9*a* is a top view of the thickness detector shown in FIG. 7*a*.
Figure 9B:
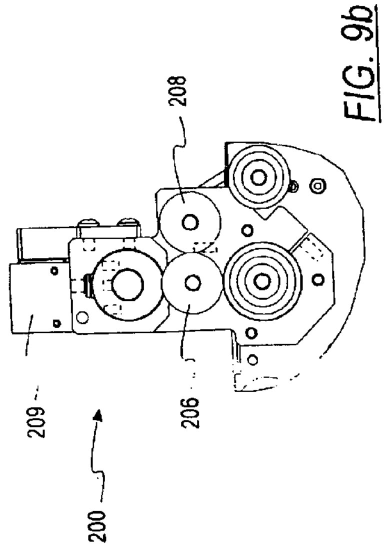
FIG. 9*b* shows an end view of the thickness detector shown in FIGS. 7*a* and 9*a*.

Accordingly, a method for determining thickness associated with a note comprises passing the note between a pair of rollers and allowing the note to displace at least one of the rollers. Displacement of the one roller is restricted to a predetermined arced path. Displacement of the one roller is measured. Thickness associated with the note may be determined based on the displacement of the one roller. Relative displacement is measured to determine thickness. Similarly, in other embodiments one or both rollers can be displaced by the bill, rather than just one roller. Preferably the rollers are set at an at-rest position. The at-rest position, also referred to as initial position, may be a position wherein an initial roller gap is set to be less than a minimum thickness of a single note e.g., 0.002 inch. Referring to FIG. 8, spring shaft 216 provides downward pressure on the upper roller 204 and damping. The spring shaft 216 is also used to adjust the initial gap between the rollers. A rubber bushing 218 maintains the spring shaft 216 in the thickness detector 200.

The processor may be programmed as a foreign object detector for detecting items such as tape, staples, paper clips, or security device detectors, such as polyester, metallic thread, etc., based on displacement of at least one roller. Note damage including paper fold, corner fold and curled edges may also be determined. Similarly, changes in thickness in a note may be determined. Such determinations may be used to detect whether a note is counterfeit, for example. Certain applications are directed to identifying embossed printing, e.g., the presence and location of such printing. And since bills are, in preferred methods, fed through the thickness detector 200 head or feet first (the long edge generally perpendicular to the direction of travel), the detector detects across the entire long-dimension (length) of the bill. And if the bill is fed narrow end first, the entire short-dimension (width) of the bill (2.6 inch for U.S. bills) is detected. Depending on the application, the pulsed width (duration) and amplitude of the displacement (or displacements) is compared against patterns and parameters by the processor; the patterns and parameters being stored in memory in some applications. Furthermore, a bill can be determined fit or unfit, for example, if the discontinuity is below a threshold of amplitude, or duration or other factor based on both the amplitude and duration.

Figure 10:
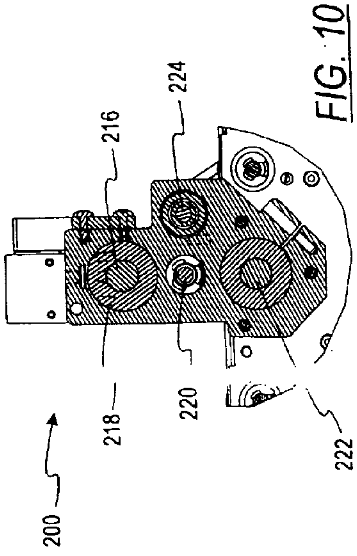
FIG. 10 shows a side section view through the thickness detector shown in FIG. 9*a* taken along line 10—10.
Figure 11:
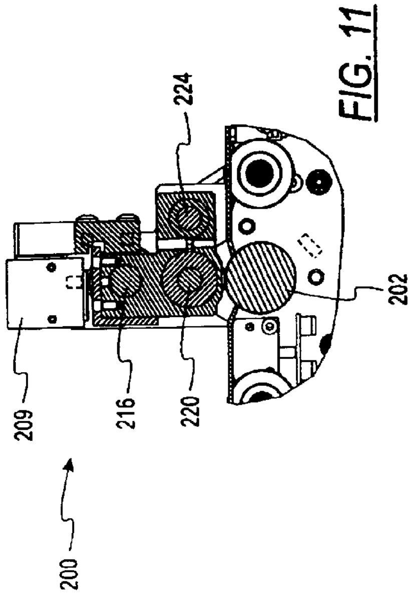
FIG. 11 shows a section view through the thickness detector shown in FIG. 9*a* taken along line 11—11.
Figure 12:
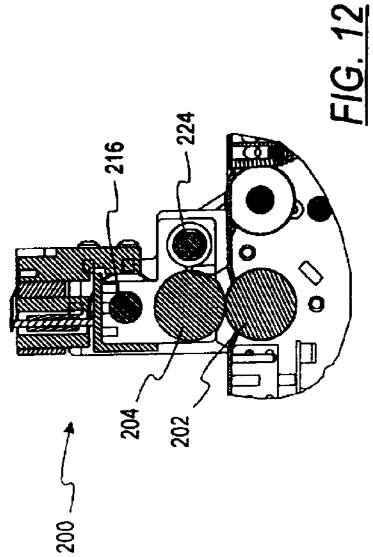
FIG. 12 shows a section view through the thickness detector shown in FIG. 9*a* taken along line 12—12.
Figure 14A:
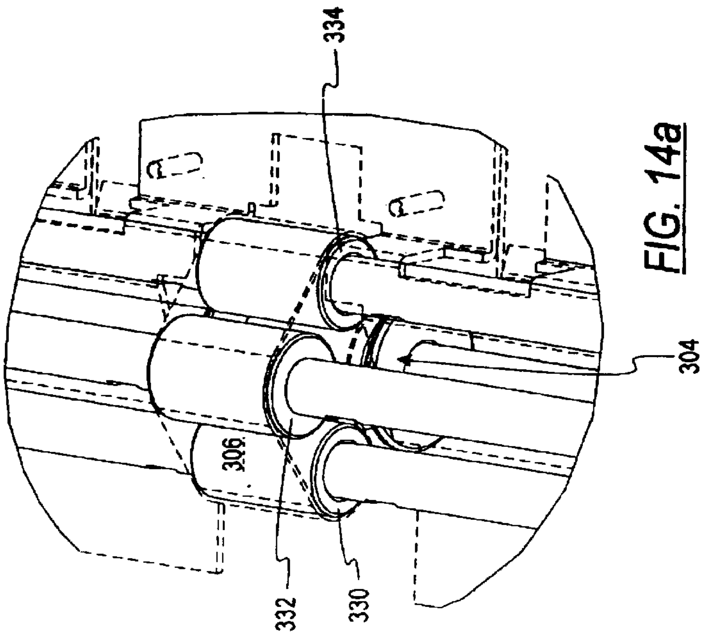
FIG. 14*a* shows an upper perspective view of the limpness detector shown in FIG. 13*a*.
Figure 14B:
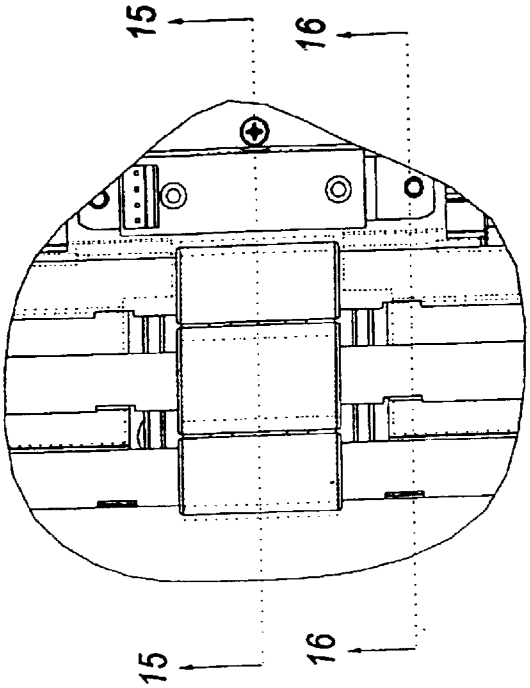
FIG. 14*b* shows a top view of the limpness detector shown in FIG. 13*a*.

FIG. 8 shows a back perspective view of the thickness detector 200 depicted in FIG. 7*a*. FIGS. 9*a*, 9*b*, 10, 11, and 12 depict top, end and section views of the thickness detector 200. An upper roller shaft 220, a lower roller shaft 222 and a driving gear shaft 224 are shown in FIG. 10.

Limpness Detection

A limpness detector 300 is described with respect to FIGS. 13–18. In a limpness detector a note 302 (see FIG. 18) is deformed or "oil canned" to produce a sound. A brick note, i.e., a new note, will produce a sound louder than a note that is limp, e.g., an old note.

In one embodiment a deforming structure 304 has a predetermined shape for deforming a note 302. Complimentary structure 306 conforms to the deforming structure 304. The note 302 is passed between the deforming structure 304 and the complimentary structure 306. The deforming structure alone or in conjunction with guides, complimentary structure, and the like, acts to deform the note about at least two transverse axes.

Figure 18:
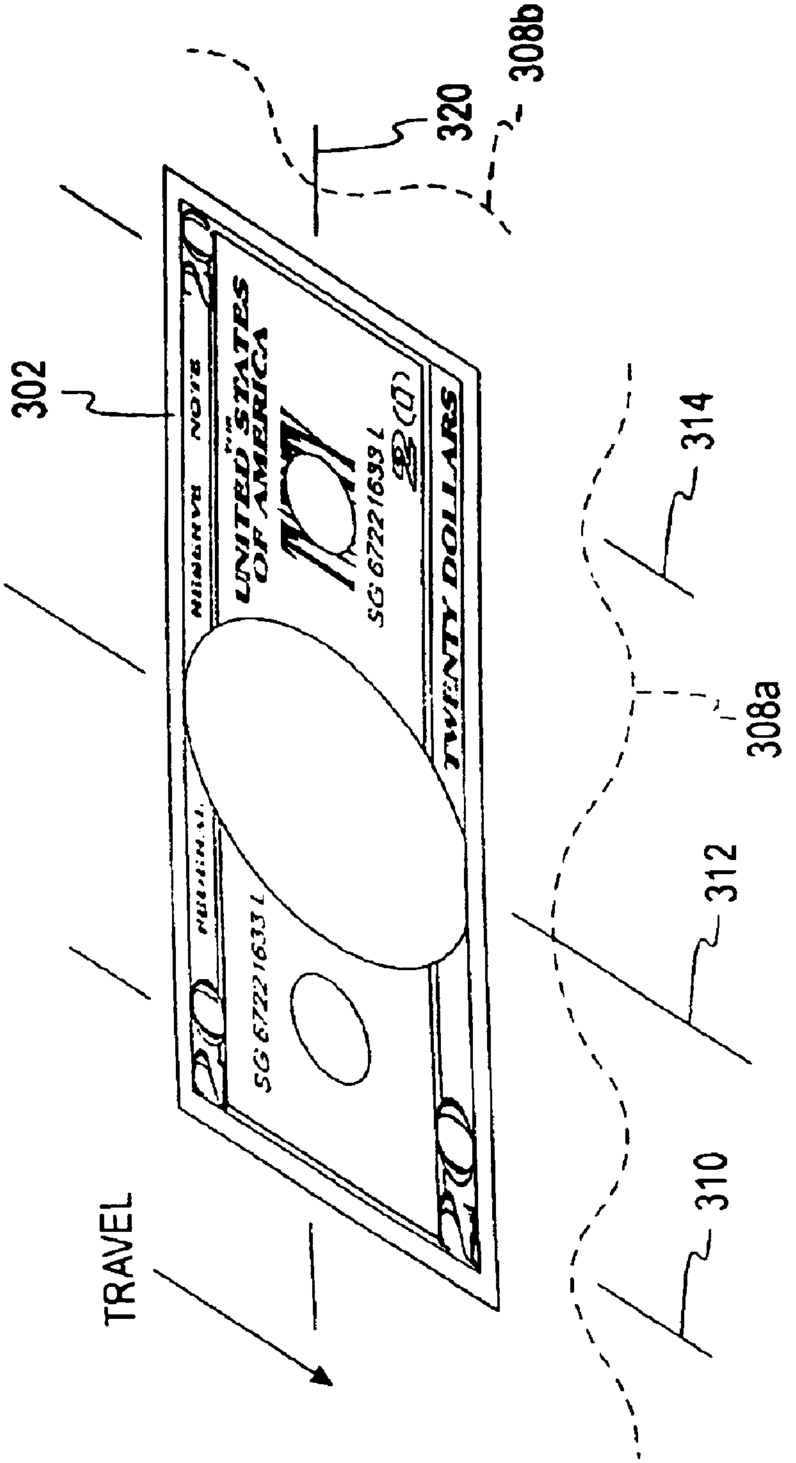
FIG. 18 depicts note edgelines deformed about a plurality of axes by the limpness detector depicted in FIG. 13.

FIG. 18 depicts the edgelines 308*a* and 308*b* of the note 302 deformed about three parallel axes 310, 312, and 314. The term edgeline is used to convey the concept that the subject line is not restricted to being a center line. But the edgeline is not necessarily coterminous with the terminal edges of the bill. Simultaneously the note is deformed about an axis transverse to one of the parallel axes. Preferably the transverse axis is a perpendicular axis, such as axis 320 identified in FIG. 18 that is perpendicular to axis 312. FIG. 18 also shows the preferred method of feeding the bill, that is width-wise with the narrow edge parallel to the direction of travel. In an alternate embodiment, the bill is deformed simultaneously about two parallel axes but not about a transverse axis. In yet another embodiment, the bill is also simultaneously deformed about a transverse axis. Those of skill in the art will understand that the edgelines vary as the bill progresses through the limpness detector. Thus, the edgeline may also be thought of as centerline of a given slice through the bill where the slice is take perpendicular to the plane of the bill.

Figure 17A:
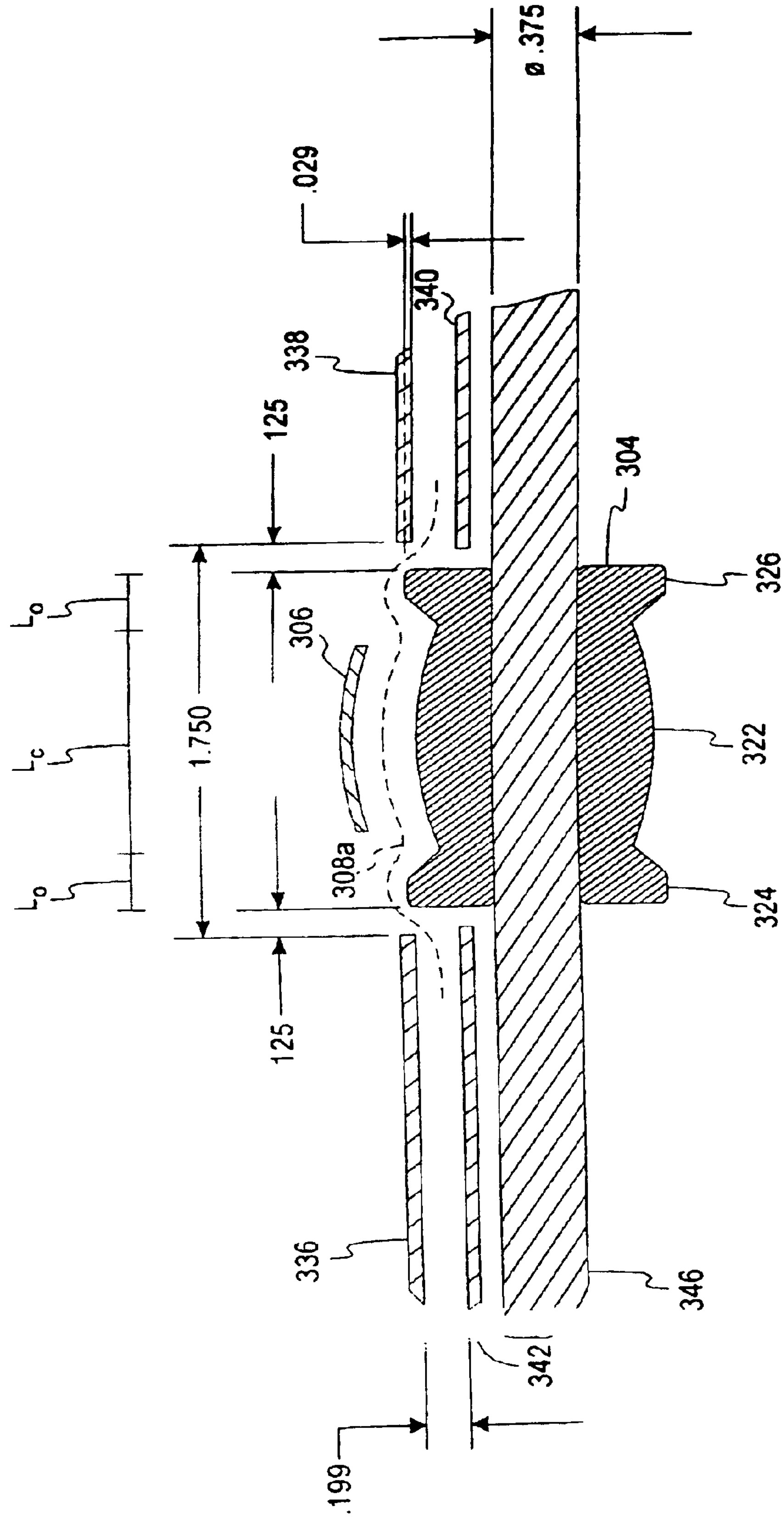
FIG. 17*a* depicts a partial section view of the limpness detector shown in FIG. 13*a*, including a note edgeline.

The deforming structure 304 depicted in FIG. 17*a* is a roller (also referred to as a crackle roller) that comprises a central bulge 322, a first outer bulge 324 extending further than the center bulge (measured from an axis about which the roller rolls, i.e., radially), and a second outer bulge 326 extending further than the central bulge 322. The center bulge 322 is axially positioned between outer bulge 324 and outer bulge 326. In the embodiment depicted the complimentary structure comprises a belt 306 conforming to the central bulge 322 over at least about $\frac{1}{8}^{th}$ of the circumference of the central bulge 322. See e.g., FIG. 15, FIGS. 17*b* and 17*c* identify the dimensions of the crackle roller 304 depicted in FIG. 17*a*.

Figure 13A:
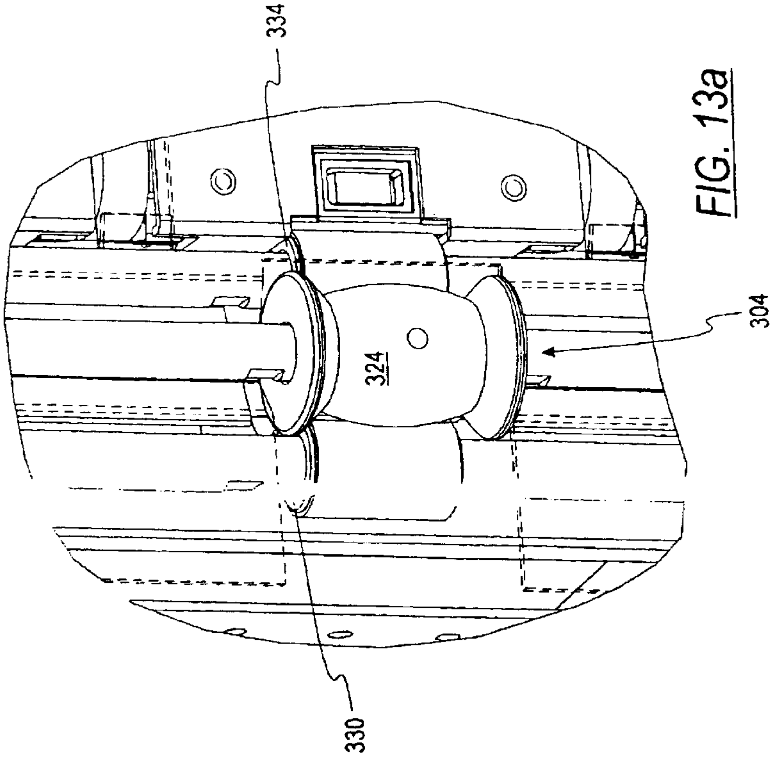
FIG. 13*a* shows a lower view of a limpness detector comprising a crackle roller.
Figure 13B:
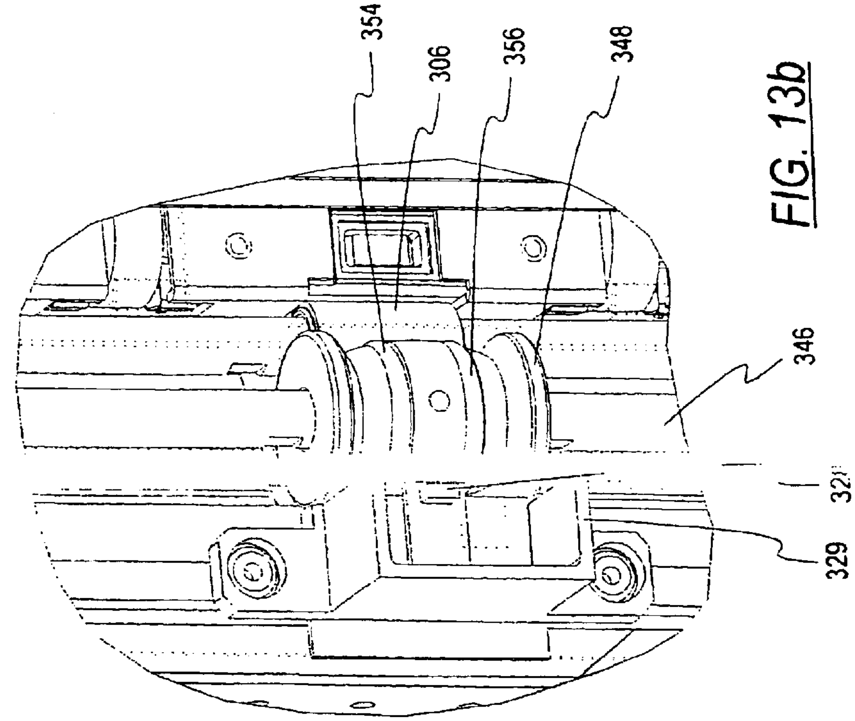
FIG. 13*b* shows a lower view of an alternate embodiment of a crackle roller.

As shown in FIG. 13*b*, a microphone 328, generally held by a microphone holder 329, is operably positioned to detect the noise produced by deforming the note. Use of a noise canceling microphone is desirable. Although placement is not critical, for some applications it is desirable to place the microphone within close proximity of where the bill will be oil-canned. Depending on the system in which the detector is placed, it may be desirable to place the microphone within about an inch of the oil-canning location. After the microphone is placed (whether near or far), a baseline is generally determined using a brick note. At least the amplitude of the sound is measured. The duration of the sound may be used to indicate if the note is skewed as it is fed through the detector (for example, between the crackle roller and the belt). Weighting factors can also be used to account for the variations in speed at which the bill is fed. Alternatively, look up tables can be used. The detected sound, which may be post-processed with the weighting factors, for example, is compared against a threshold to determine acceptability.

Figure 15:
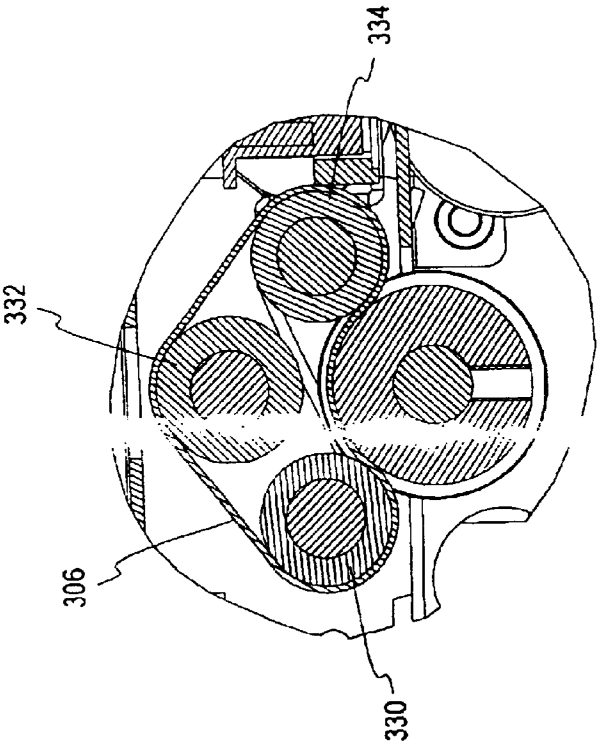
FIG. 15 shows a section view through the limpness detector shown in FIG. 14*b* taken along line 15—15.

FIG. 15 shows a section view (taken along line 15—15 of FIG. 14*b*) of three idler rollers 330, 332, and 334 for shaping the flexible belt 306. The belt 306 is shown conforming to between $\frac{1}{4}^{th}$ and ½ the circumference of the central bulge. The belt width, best shown in FIG. 17*a*, is approximately 1 inch. In one embodiment the crackle roller 304 is driven and the flexible belt 306 rotates in response to interaction with the driven crackle roller 304. Alternatively, the belt 306 may be driven. Using a single roller with a single belt reduces damage to the bill while still performing the oil-canning function as compared to systems that use multiple rigid rollers. Similarly, using a conforming roller in conjunction with a rigid roller that functions to deform both the bill and the conforming roller will not damage a bill as much as using two rigid rollers. Thus, two rollers may be used where one is deformable (the complimentary structure) and one is the deforming roller (the deforming structure).

Figure 16:
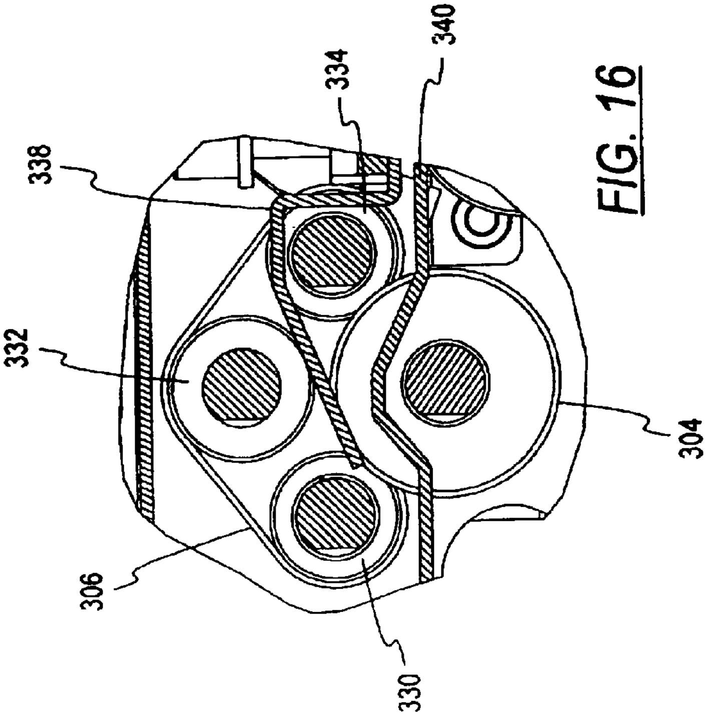
FIG. 16 shows a section view of the limpness detector shown in FIG. 14*b* taken along line 16—16 depicting guide plates.

Referring to FIG. 17*a*, some embodiments use guides in conjunction with or as part of deforming structure 304. First guide 336 and second guide 338 are positioned relative to the first outer bulge 324 and second outer bulge 326 to deform the note 302 as shown by note edgeline 308*a*. FIG. 16 shows a section view (taken along line 16—16 of FIG. 14*b*) of guide 338 as a top plate along with a bottom plate 340. FIG. 17*a* illustrates a cross-section view with bill edgeline 308*a* guided between top guides (336 and 338) and bottom guides (340 and 342). Crackle roller 304 is mounted on axle 346. The note 302 is passed between the top plate 338 and the bottom plate 340 to pass between the crackle roller 304 and the flexible belt 306. Use of a sheet metal plate for the guide contributes to oil canning the bank note, e.g., a better signal to noise ratio may be obtained.

The belt 306 and guides 336 and 338 may be operably positioned relative to the crackle roller 304 to oil can a single note or a brick pack, depending on the application to which system 10 is put. Because the belt is in contact with the roller (for many applications) it is desirable to drive only one of the two.

Figure 17B:
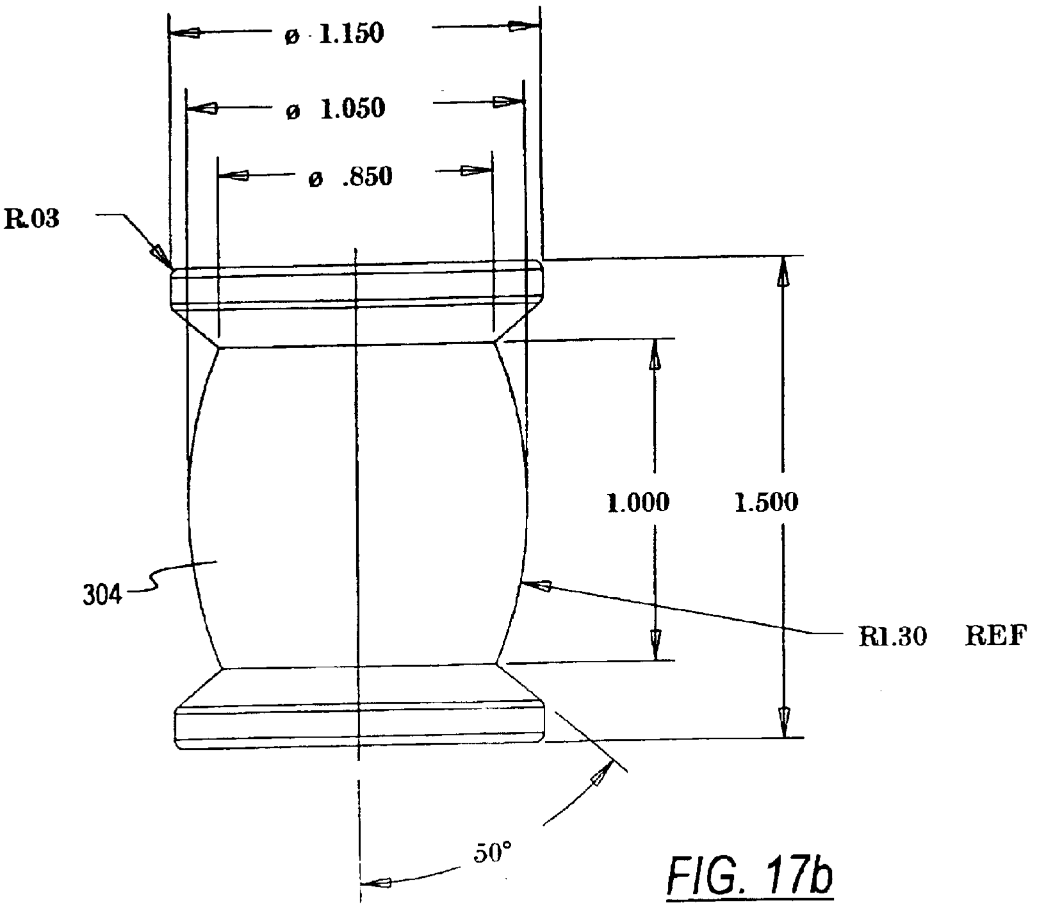
FIG. 17*b* shows a top view of a crackle roller.
Figure 17C:
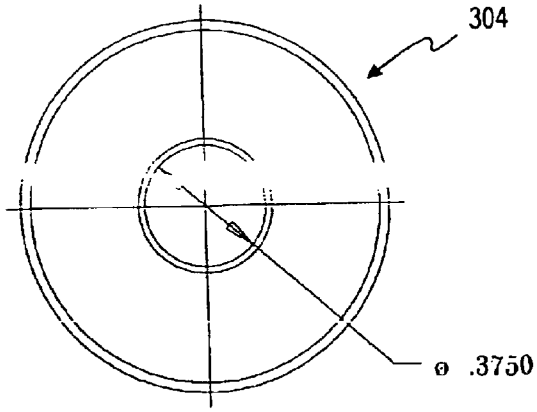
FIG. 17*c* shows an end view of the crackle roller shown in FIG. 17*b*.
Figure 17D:
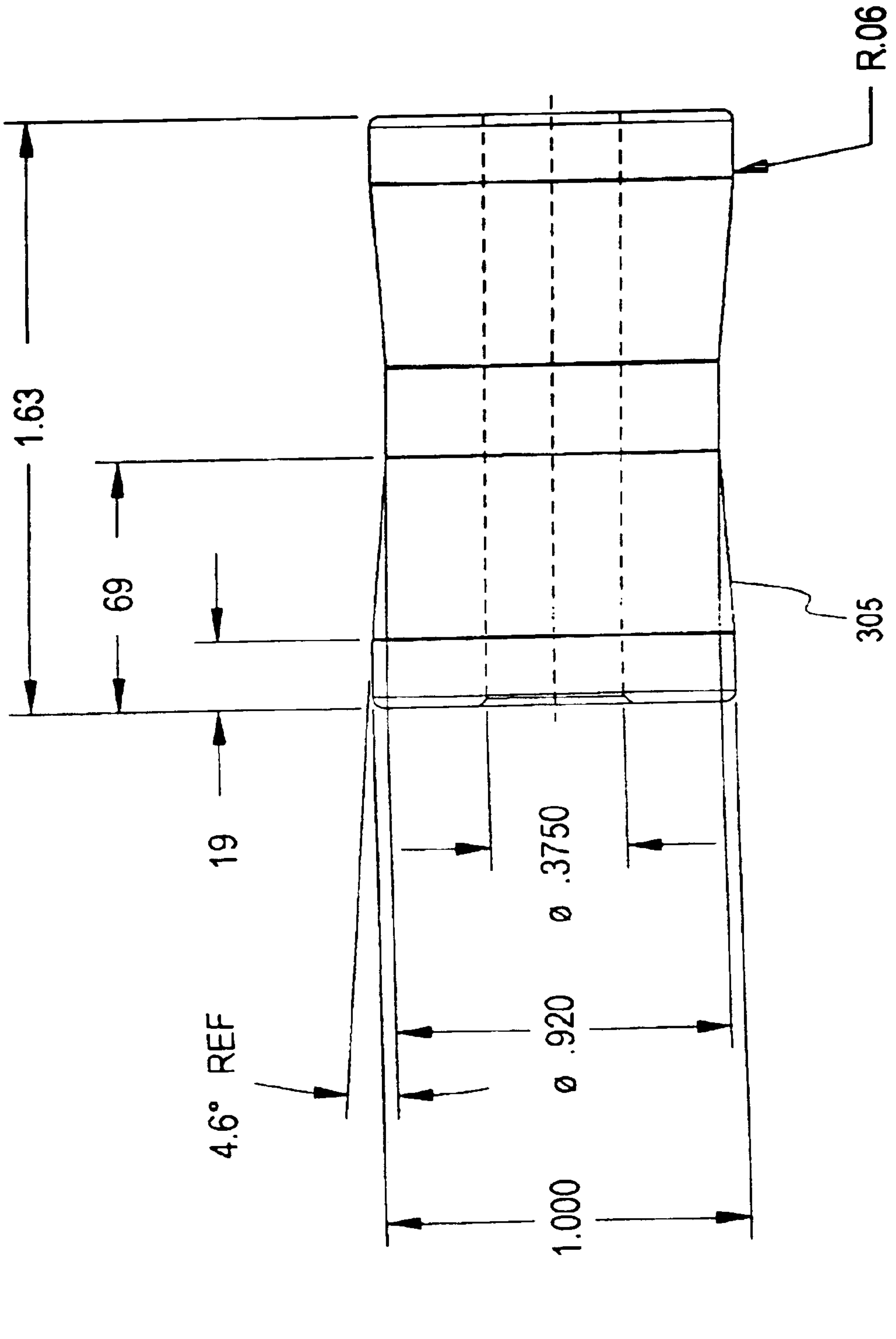
FIG. 17*d* shows an alternate embodiment of a crackle roller.

With reference to FIG. 17*a*, the crackle roller 304 outer bulges 324 and 326 each comprise an axial length $L_O$. although each may be of different axial lengths. The axial length of the central bulge 322 is $L_C$. For some applications, it is preferred that the central bulge axial length $L_C$ is in the range between $2\times L_O$ and $4\times L_O$. For some embodiments, the outer bulges are adapted to be positioned closer to the edges of the bill than to the center of the bill. The dimensions of the roller shown in FIGS. 17*b* and 17*c* are suitable for bills of various dimensions, e.g., for bills having a widthwise dimension in the range of 4 inch to 8 inch. Typically the narrow dimension of the bill does not exceed 4 inches. FIG. 17*d* shows crackle roller 305 as an alternate embodiment from crackle roller 304. The central portion of crackle roller 305 is concave rather than convex as with crackle roller 304. Other embodiments of deforming structures that may serve to deform a note simultaneously about two or more axes will be apparent to those of skill in the art from the teachings in this document.

Figure 17F:
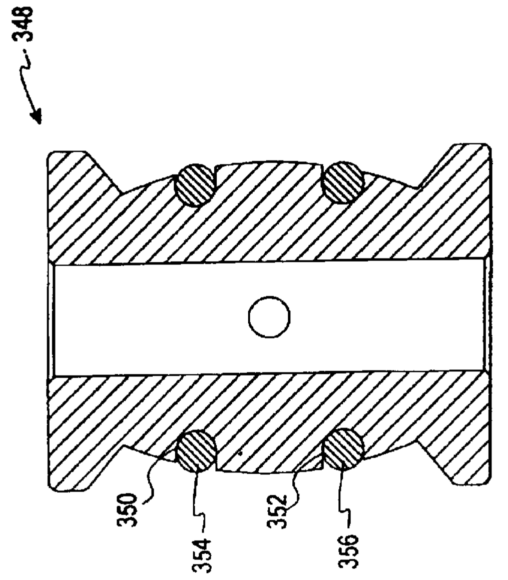
FIG. 17*f* shows a section view of the crackle roller shown in FIG. 17*e* taken along line 17*f*—17*f* with friction enhancing members in the channels.
Figure 17E:
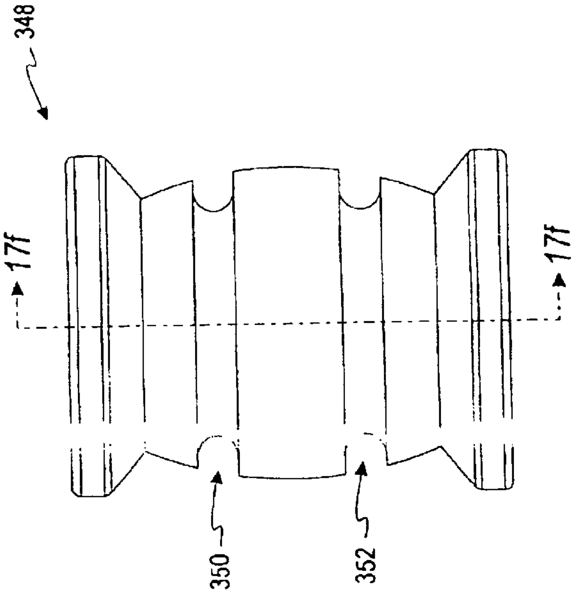
FIG. 17*e* shows a crackle roller comprising a plurality of channels.

FIGS. 13*b* and 17*e* depict a crackle roller 348 comprising a plurality channels 350 and 352. FIG. 17*f* shows a section view of the crackle roller 348 shown in FIG. 17*e* taken along line 17*f*—17*f*. A plurality of friction enhancing members 354 and 356 having friction enhancing surfaces are respectively positioned in channels 350 and 352. The friction enhancing members 354 and 356 in FIG. 17*f* are polyurethane O-rings. The O-rings provide enhanced friction relative to a smooth aluminum surface. The friction enhancing qualities may be provided by any suitable friction enhancing surface, e.g., tape, rubber, along the surface of the crackle roller. Further, in some embodiments, the crackle roller is made of a friction enhancing material. The friction enhancing surface reduces slippage between the crackle roller and a bill as compared to crackle roller having a smooth aluminum surface. Thus, to reduce bill slippage a crackle roller may be friction enhanced or provided with friction enhancement.

The sound produced by deforming the note varies with speed. The detecting system determines limpness based on the sound produced. The limpness detecting system may employ software, firmware, etc. and this software, firmware, etc. may comprise zeroing software, firmware, etc. to account for the speed at which the note is transported through the system. Bills that produce a sound below a predetermined threshold may be designated as "unfit" and identified or selected for being taken out of circulation. Therefore a transport mechanism can divert a bill based on the sound produced by deforming the bill. For example, an unfit bill may be diverted to one or more output receptacles separate from one or more output receptacles receiving fit bills. For example, unfit bills may be diverted to a reject output receptacle. According to some embodiments, the detection of an unfit bill may cause the operation of a currency handling device to be halted instead of or in addition to diverting an unfit bill.

Soil Detection

An embodiment of a soil detector suitable for use with the currency handler 10 uses a light source and a scanner. In some embodiments, a white light source is used in combination with a universal scanner such as described in U.S. Pat. No. 6,256,407. Detection is based on the reflection of the light from the entire bill to determine soil level. Soil algorithms are based on contrast for some applications. Alternatively, soil algorithms may be based on reflected light intensity or a combination of contrast and intensity. Intensity comprises testing the entire bill and/or small non print regions of the bill. The reflected light intensity level is an indication of the soil level. Contrast comprises testing the reflected light intensity level of light regions of the note (non print) against dark regions (heavy print). The level of reflected light intensity is reduced in soiled notes when compared to the dark print areas of the note. Contrast is also used to compare washed out notes when the reflected light intensity of the dark portions of the note are in excessive levels.

An apparatus, including a scanhead, suitable for soil detection of a bill is disclosed in U.S. Pat. No. 6,256,407 (the "'407 patent"), which issued Jul. 3, 2001, and is incorporated herein by reference in its entirety. The brightness level, as described in the '407 patent, is the sum of red, blue and green sensor outputs. Any combination of red, blue, green or brightness (the sum) can be used to determine the soil fitness level.

In particular embodiments, the soil algorithms rely on scanner decisions to determine which portions (and corresponding patterns) of the bill to analyze rather than analyzing the whole bill to determine soil level. The portions selected for analysis are, in some applications determined based on the denomination and orientation of the bill. Some embodiments use a fill width of 39 sets of RGB sensors that takes a bit-map image of the bill. The image can then be buffered and analyzed to determine denomination and orientation of the bill. Thus, based on the denomination and orientation of the bill, specific patterns of the bill can be analyzed to determine soil level. For example, the patterns corresponding to five cells of sensors of the scanner may be the only patterns analyzed. Auto calibration with operator selectable thresholds is desirable.

An embodiment of a scanhead 400 that may be used to detect soil levels is described with reference to FIGS. 19*a*–19*f*. The scanhead 400 includes a body 402 that has a plurality of filter and sensor receptacles 403 along its length as best seen in FIG. 19*b*. Each receptacle 403 is designed to receive a color filter 406 (which may be a clear piece of glass) and a sensor 404, one set of which is shown in an exploded view in FIG. 19*b* (also in FIG. 19*f*). A filter 406 is positioned proximate a sensor 404 to transmit light of a given wavelength range of wavelengths to the sensor 404. As illustrated in FIG. 19*b*, one embodiment of the scanhead housing 402 can accommodate forty-three sensors 404 and forty-three filters 406.

A set of three filters 406 and three sensors 404 comprise a single color cell 434 on the scanhead 400. According to one embodiment, three adjacent receptacles 403 having three different primary color filters therein constitute one full color cell, e.g., 434*a*. The scanhead 400 further includes a reference sensor 450.

Figure 19A:
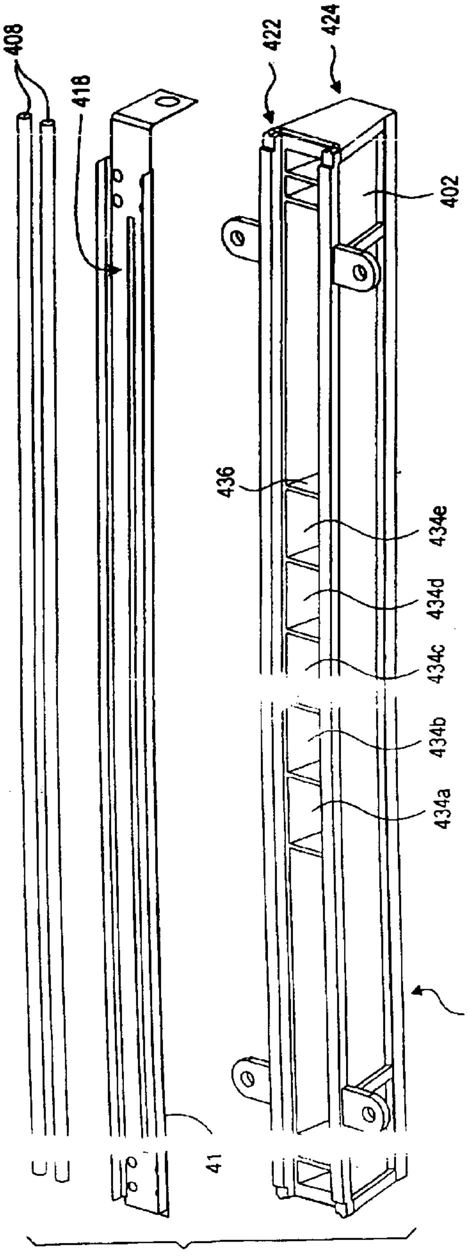
FIG. 19*a* is an exploded perspective view of one embodiment of a color scanhead for use in currency handling systems.
Figure 19B:
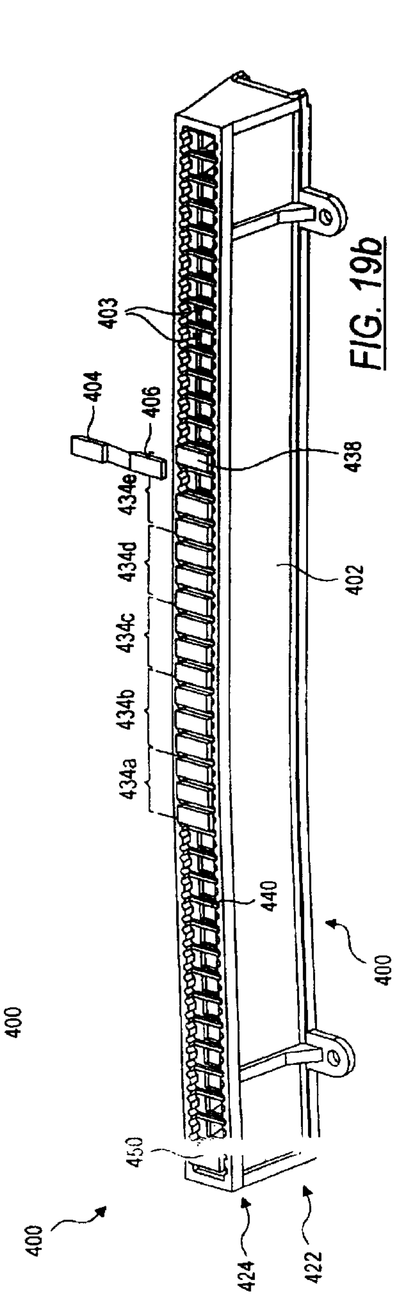
FIG. 19*b* is a bottom perspective view of the color scanhead of FIG. 19*a*.
Figure 19C:
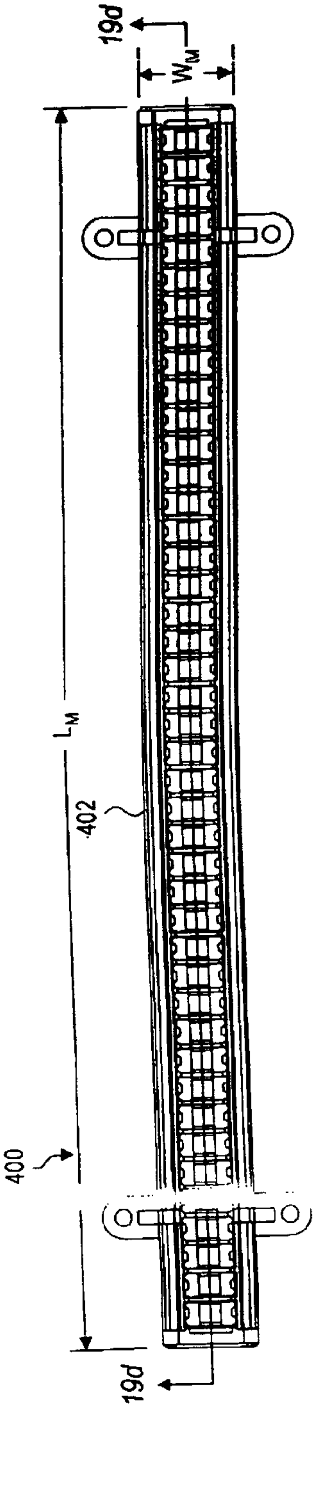
FIG. 19*c* is a bottom view of the color scanhead of FIG. 19*a*.
Figure 19D:
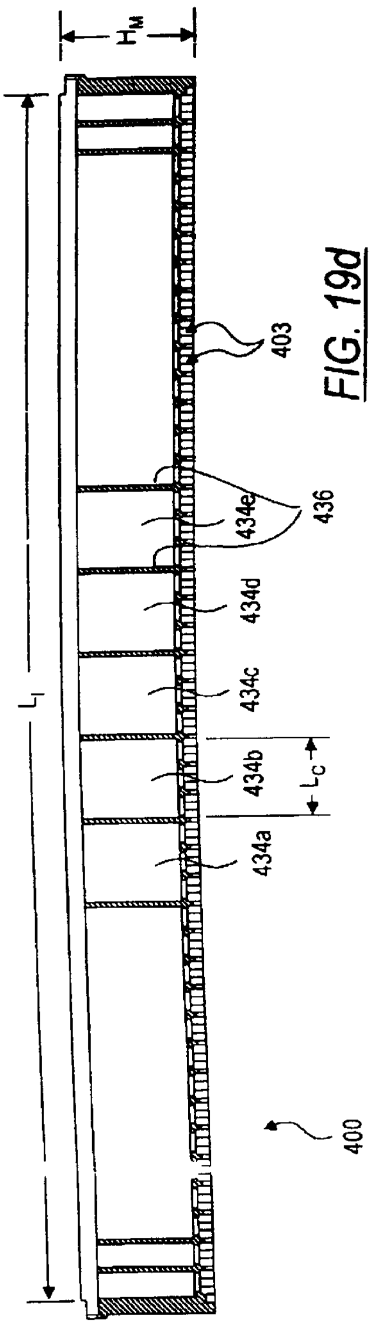
FIG. 19*d* is a sectional side view of the color scanhead of FIG. 19*c*.
Figure 19E:
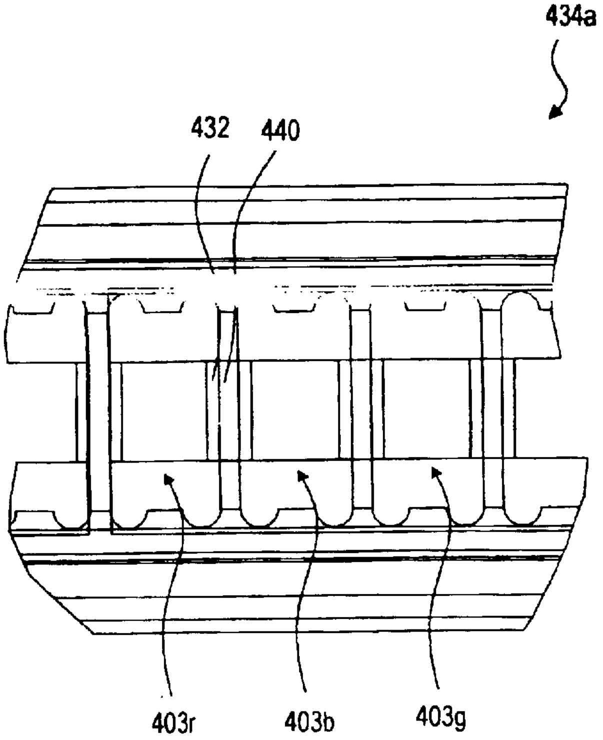
FIG. 19*e* is an enlarged bottom view of a section of the color scanhead of FIG. 19*b*.
Figure 19F:
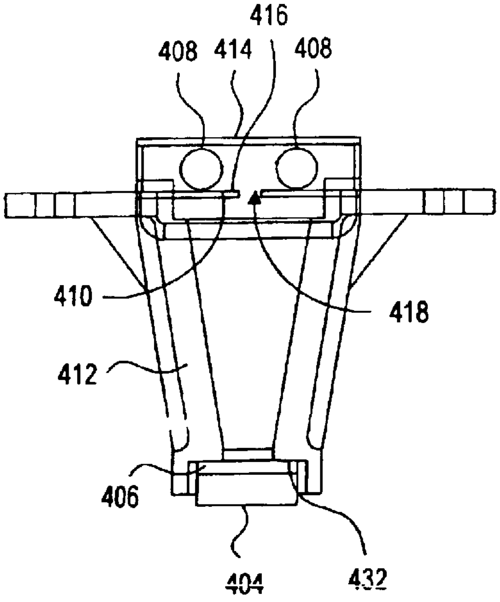
FIG. 19*f* is a sectional end view of the color scanhead of FIG. 19*a*.

As seen in FIG. 19*f*, the sensors 404 and filters 406 are positioned within the filter and sensor receptacles 403 in the body 402 of the scanhead 400. Each of the receptacles has ledges 432 for holding the filters 406 in the desired positions. The sensors 404 are positioned immediately behind their corresponding filters 406 within the receptacle 403.

FIG. 19*e* illustrates one full color cell such as cell 434*a* on the scanhead 400. The color cell 434*a* comprises a receptacle 403*r* for receiving a red filter 406*r* (not shown) adapted to pass only red light to a corresponding red sensor 404*r* (not shown).

The cell further comprises a blue receptacle 403*b* for receiving a blue filter 406*b* (not shown) adapted to pass only blue light to a corresponding blue sensor 404*b*, and a green receptacle 403*g* for receiving a green filter 406*g* (not shown) adapted to pass only green light to a corresponding green sensor 404*g*. Additionally, there are sensor partitions 440 between adjacent filter and sensor receptacles 403 to prevent a sensor in one receptacle, e.g., receptacle 403*b*, from receiving light from filters in adjacent receptacles, e.g., 403*r* or 403*g*. In this way, the sensor partitions eliminate cross-talk between a sensor and filters associated with adjacent receptacles. Because the sensor partitions 440 prevent sensors 404 from receiving wavelengths other than their designated color wavelength the sensors 404 generate analog outputs representative of their designated colors. Other full color cells such as cells 434*b*, 434*c*, 434*d* and 434*e* are constructed identically.

As seen in FIGS. 19*a* and 19*d*, cells are divided from each other by cell partitions 436 which extend between adjacent color cells 434 from the sensor end 424 to the mask end 422. These partitions ensure that each of the sensors 404 in a color cell 434 receives light from a common portion of the bill. The cell partitions 436 shield the sensors 404 of a color cell 434 from noisy light reflected from areas outside of that cell's scan area such as light from the scan area of an adjacent cell or light from areas outside the scan area of any cell. To further facilitate the viewing of a common portion of a bill by all the sensors in a color cell 434, the sensors 404 are positioned 0.655 inches from the slit 418. This distance is selected based on the countervening considerations that (a) increasing the distance reduces the intensity of light reaching the sensors and (b) decreasing the distance decreases the extent to which the sensors in a cell see the same area of a bill. Placing the light source on the document side of the slit 418 makes the sensors more forgiving to wrinkled bills because light can flood the document since the light is not restricted by the mask 410. Because the light does not have to pass through the slits of a mask, the light intensity is not reduced significantly when there is a slight (e.g., 0.03") wrinkle in a document as it passes under the scanhead 400.

Referring to FIG. 19*b*, the dimensions [l, w, h] of the filters 406 are 0.13, 0.04, 0.23 inches and the dimensions of the filter receptacles 403 are 0.141×0.250 inches and of the sensors 304 are 0.174×0.079×0.151 inches. The active area of each sensor 404 is 0.105×0.105 inches.

Each sensor generates an analog output signal representative of the characteristic information detected from the bill. Specifically, the analog output signals from each color cell 434 are red, blue and green analog output signals from the red, blue and green sensors 404*r*, 404*b* and 404*g*, respectively. These red, blue and green analog output signals are amplified by an amplifier and converted into digital red, blue and green signals by means of an analog-to-digital converter (ADC) unit whose output is fed as a digital input to a central processing unit (CPU). According to one embodiment, the outputs of an edge sensor 438 and the green sensor of the left color cell 434*a* are monitored by a processor to initially detect the presence of the bill adjacent the color scanhead 400 and, subsequently, to detect the bill edge.

As seen in FIG. 19*a*, a mask 410 having a narrow slit 418 therein covers the top of the scanhead. The slit 418 is 0.050 inches wide. A pair of light sources 408 illuminate a bill as it passes the scanhead 400 on the transport plate. The illustrated light sources 408 are fluorescent tubes providing white light with a high intensity in the red, blue and green wavelengths. As mentioned above, the fluorescent tubes 408 may be part number CBY26-220NO manufactured by Stanley of Japan. These tubes have a spectrum from about 400 mm to 725 mm with peaks for blue, green and red at about 430 mm, 540 mm and 612 mm, respectively. As can be seen in FIG. 19*f*, the light from the light sources 408 passes through a transparent glass shield 414 positioned between the light sources 408 and the transport plate. The glass shield 414 assists in guiding passing bills flat against the transport plate as the bills pass the scanhead 400 The glass shield 414 also protects the scanhead 400 from dust and contact with the bill.

Because light diffuses with distance, the scanhead 400 is designed to position the light sources 408 close to the transport path to achieve a high intensity of light illumination on the bill. In one embodiment, the tops of the fluorescent tubes 408 are located 0.06 inches from the transport path. The mask 410 of the scanhead 400 also assists in illuminating the bill with the high intensity light. Referring to FIG. 19*f*, the mask 410 has a reflective surface 416 facing to the light sources 408. The reflective side 416 of the mask 410 directs light from the light sources 408 upwardly to illuminate the bill.

Light reflected off the illuminated bill enters a manifold 412 of the scanhead 400 by passing through the narrow slit 418 in the mask 410. The slit 418 passes light reflected from the scan area or the portion of the bill directly above the slit 418 into the manifold 412. The reflective side 416 of the mask 410 blocks the majority of light from areas outside the scan area from entering the manifold 412. In this manner, the mask serves as a noise shield by preventing the majority of noisy light or light from outside the scan area from entering the manifold 412. In one embodiment, the slit has a width of 0.050 inch and extends along the 6.466 inch length the scanhead 400. The distance between the slit and the bill is 0.195 inch, the distance between the slit and the sensor is 0.655 inch, and the distance between the sensor and the bill is 0.85 inch. The ratio between the sensor-to-slit distance and the slit-to-bill distance is 3.359:1. By positioning the slit 418 away from the bill, the slit 418 passes light reflected from a greater area of the bill. Increasing the scan area yields outputs corresponding to an average of a larger scan area. One advantage of employing fewer samples of larger areas is that the currency handling system is able to process bills at a faster rate, such as at a rate of 1200 bills per minute. Another advantage of employing larger sample areas is that by averaging information from larger areas, the impact of small deviations in bills which may arise from, for example, normal wear and/or small extraneous markings on bills, is reduced.

As best seen in FIGS. 19*c* and 19*d*, in one embodiment, the scanhead 400 has a length $L_M$ of 7.326 inches, a height $H_M$ of 0.79 inches, and a width $W_M$ of 0.5625 inches. Each cell has a length $L_C$ of ½ inches and the scanhead has an overall interior length $L_I$ 7.138 inches. In the embodiment depicted in FIG. 19*d*, the scanhead 400 is populated with five full color cells 434*a*, 434*b*, 434*c*, 434*d* and 434*e* laterally positioned across the center of the length of the scanhead 400 and one edge sensor 438 at the left of the first color site 434*a*. The edge sensor 438 comprises a single sensor without a corresponding filter to detect the intensity of the reflected light and hence acts as a bill edge sensor.

While the embodiment shown in FIG. 19*d* depicts an embodiment populated with five full color cells, because the body 402 of the scanhead 400 has sensor and filter receptacles 403 to accommodate up to forty-three filters and/or sensors, the scanhead 400 may be populated with a variety of color cell configurations located in a variety of positions along the length of the scanhead 400. For example, in one embodiment only one color cell 434 may be housed anywhere on the scanhead 400. In other situations up to fourteen color cells 434 may be housed along the length of the scanhead 400. Additionally, a number of edge sensors 438 may be located in a variety of locations along the length of the scanhead 400.

Moreover, if all of the receptacles 403 were populated, it would be possible to select which color cells to use or process to scan particular bills or other documents. This selection could be made by a processor based on the position of a bill as sensed by the position sensors. This selection could also be based on the type of currency being scanned, e.g. country, denomination, series, etc., based upon an initial determination by other sensor(s) or upon appropriate operator input.

According to one embodiment, the cell partitions 436 may be formed integrally with the body 402. Alternatively, the body 402 may be constructed without cell partitions, and configured such that cell partitions 436 may be accepted into the body 402 at any location between adjacent receptacles 403. Once inserted into the body 402, a cell partition 436 may become permanently attached to the body 402. Alternatively, cell partitions 436 may be removeably attachable to the body such as by being designed to snap into and out of the body 402. Embodiments that permit cell partitions 436 to be accepted at a number of locations provide for a very flexible color scanhead that can be readily adapted for different scanning needs such as for scanning currency bills from different countries.

In this manner, standard scanhead components can be manufactured and then assembled into various embodiments of scanheads adapted to scan bills from different countries or groups of countries based on the positioning of cell locations. Accordingly, a manufacturer can have one standard scanhead body 402 part and one standard cell partition 436 part. Then by appropriately inserting cell partitions into the body 402 and adding the appropriate filters and sensors, a scanhead dedicated to scanning a particular set of bills can be easily assembled.

Alternatively, a universal scanhead can be manufactured that is fully populated with cells across the entire length of the scanhead. For example, the scanhead 400 may comprise fourteen color cells and one edge cell. Then a single scanhead may be employed to scan many types of currency. The scanning can be controlled based on the type of currency being scanned. For example, if the operator informs the currency handling system, or the currency handling system determines, that Canadian bills are being processed, the outputs of sensors in cells 434*a*–434*e* can be processed. Alternatively, if the operator informs the currency handling system, or the currency handling system determines that Thai bills are being processed, the outputs of sensors in cells near the edges of the scanhead can be processed.

Figure 19G:
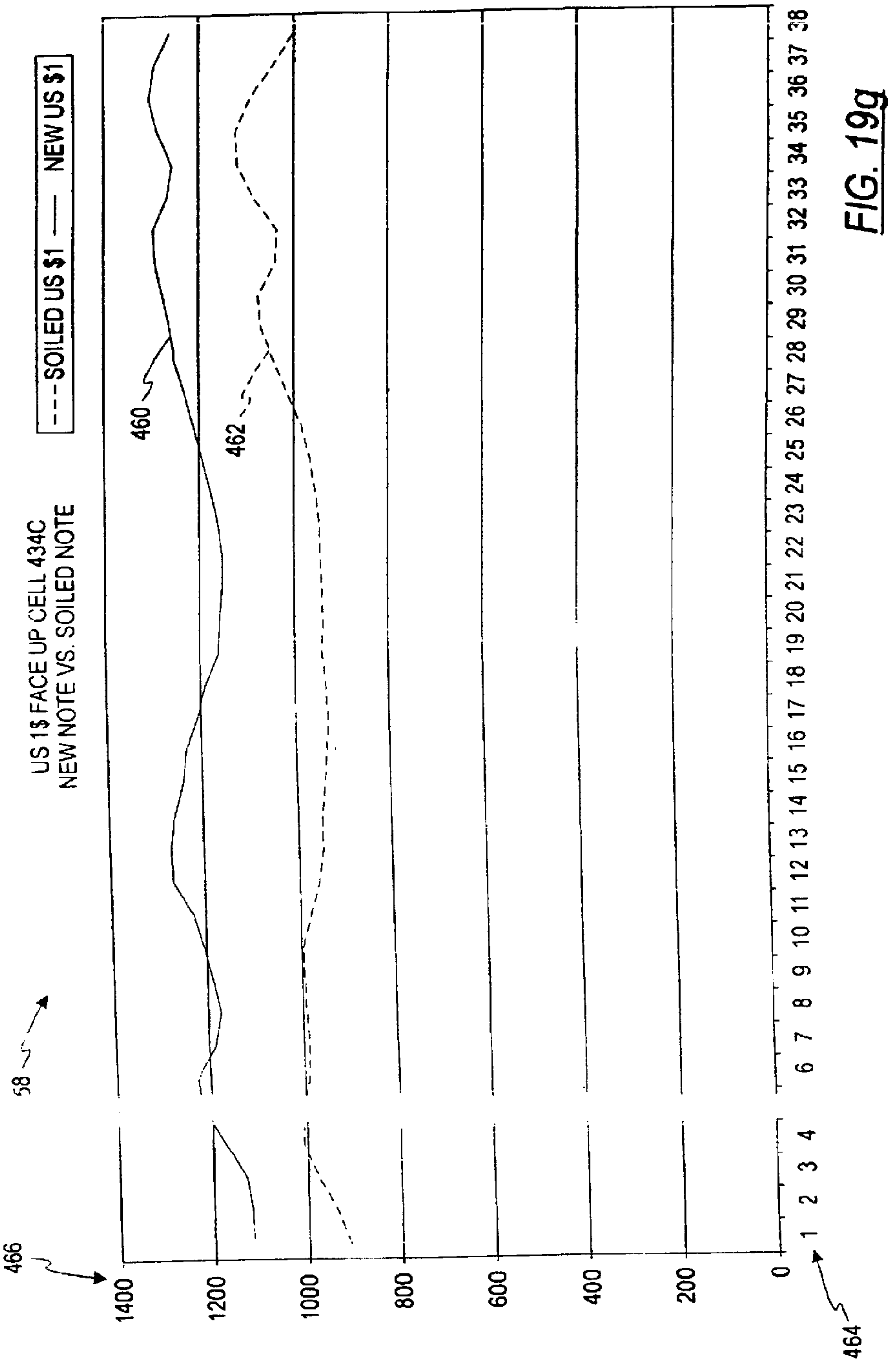
FIG. 19*g* shows a chart depicting soil levels obtained from a single scanner cell. A new note is compared to a soiled note.

FIG. 19*g* shows chart 458 depicting a comparison between a soil level for a new note (line 460) and soil level for a soiled note (line 462). The horizontal axis 464 shows the number of samples taken as the bill passed cell 434*c*. Chart 458 shows 38 samples were taken. The number of samples taken is a function of the width of the note (length along direction of travel) and speed of travel and other factors apparent to those of skill in the art. The vertical axis 466 shows a soil level value, for example the digital value of the analog value of the detected soil level. As stated above, any combination of red, blue, green or brightness (the sum of red, blue, green) can be used to determine soil level. The operator can set the thresholds for determining if a bill is unfit. Such thresholds may, for example, include amplitude, amplitude over a predetermined number of taken samples (38 taken samples in chart 458) or over a continuous span of samples.

Figure 19H:
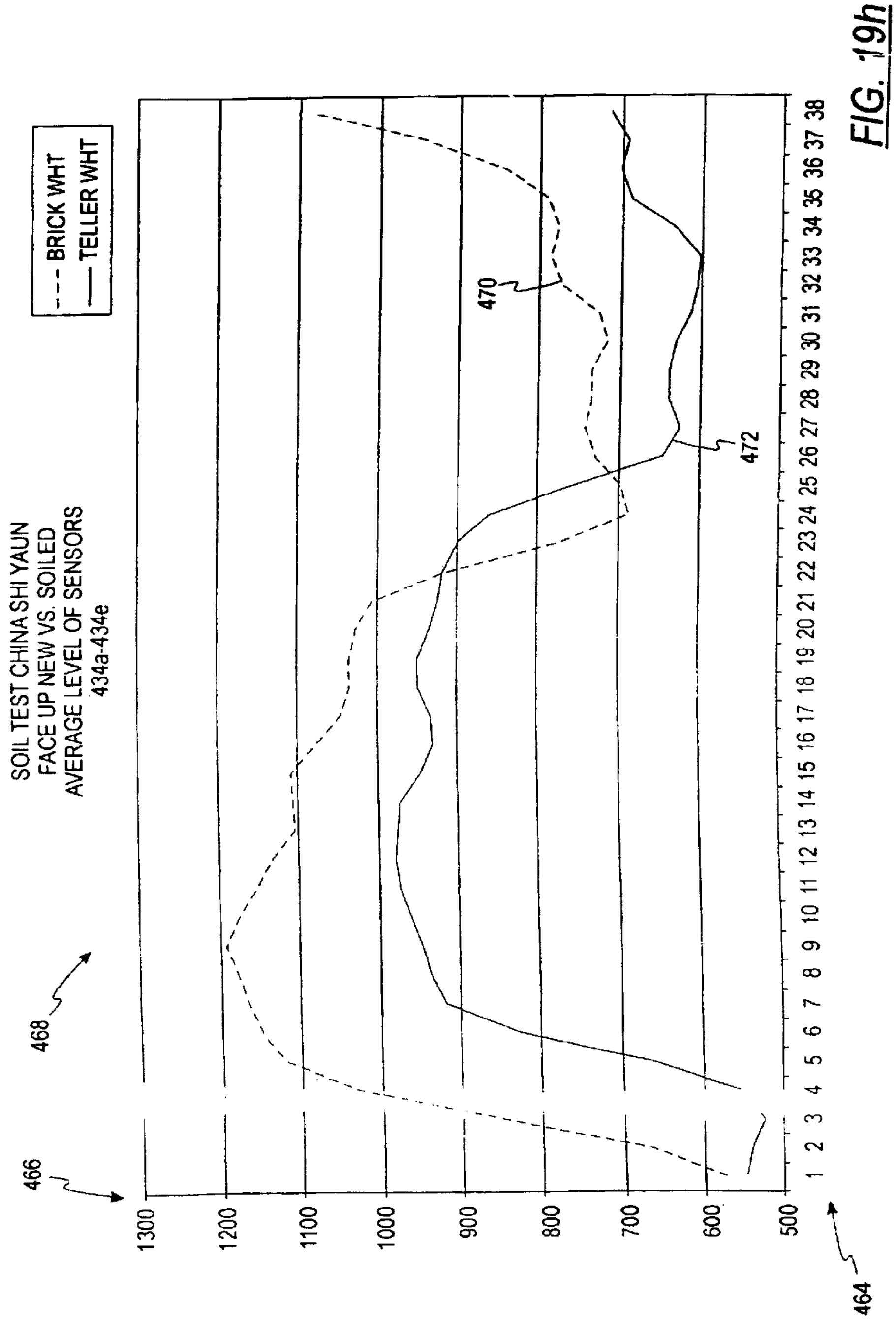
FIG. 19*h* shows a chart depicting soil levels obtained from an average of five scanner cells.

FIG. 19*h* shows a chart 468 depicting a comparison between soil levels of a new note (line 470) and a soiled note (line 472). Whereas the values depicted in chart 458 are based on a single cell, the values depicted in chart 468 represent the average of values detected by cells 434*a*–434*e*.

Additional Embodiments

Figure 20A:
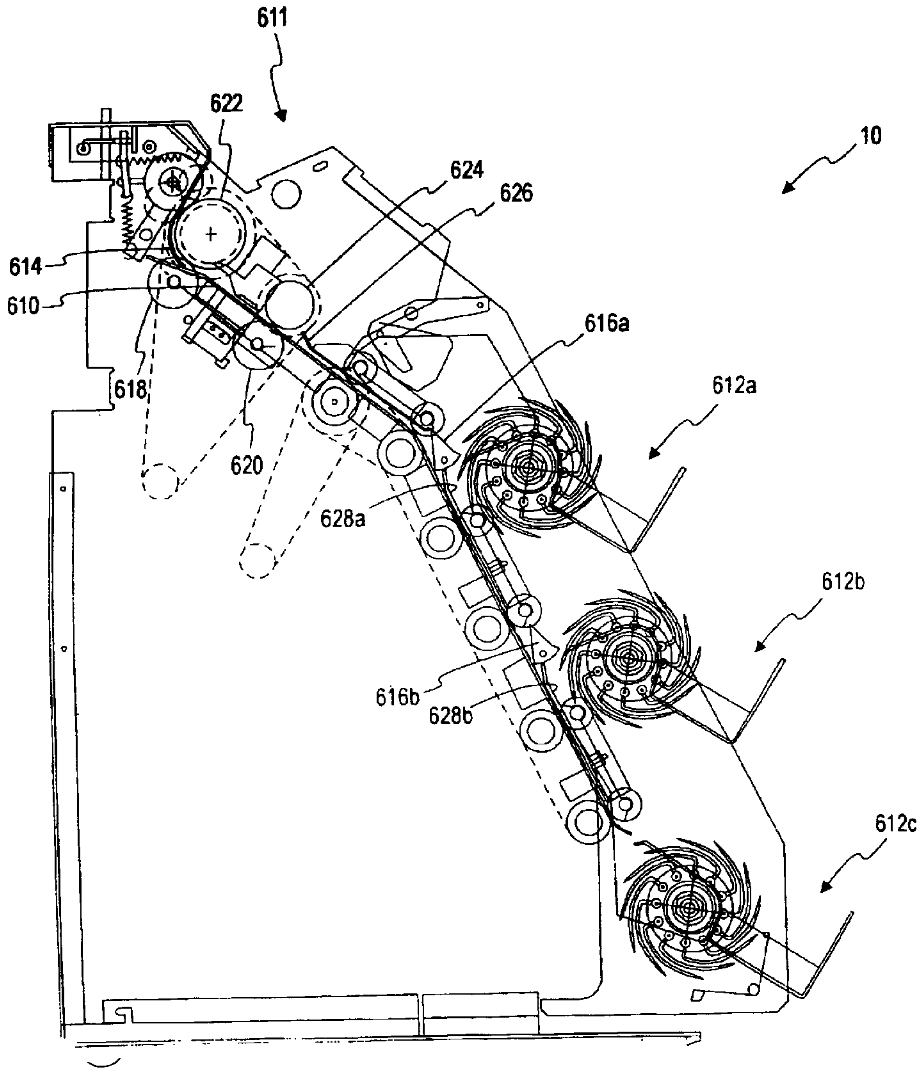
FIG. 20*a* depicts a three-pocket document handling device.
Figure 20B:
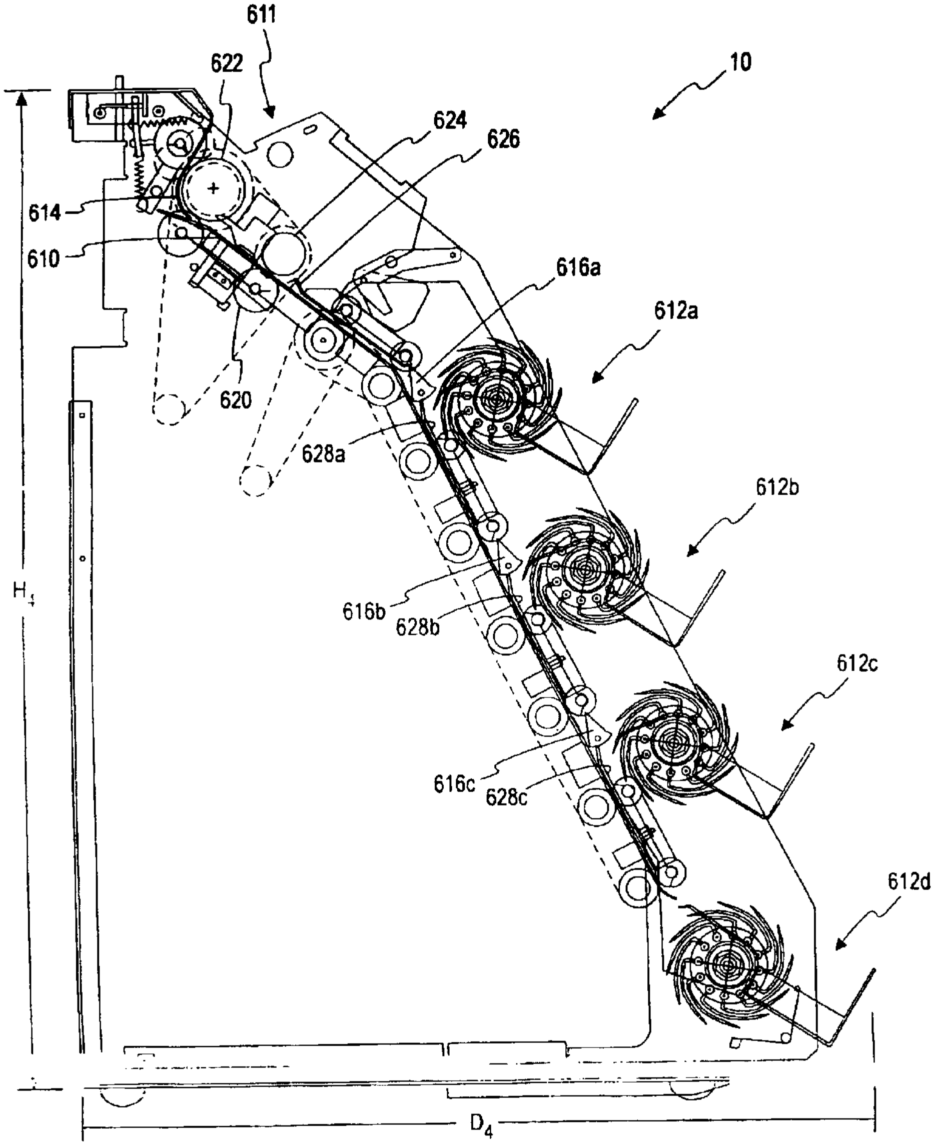
FIG. 20*b* depicts a four-pocket document handling device.
Figure 20C:
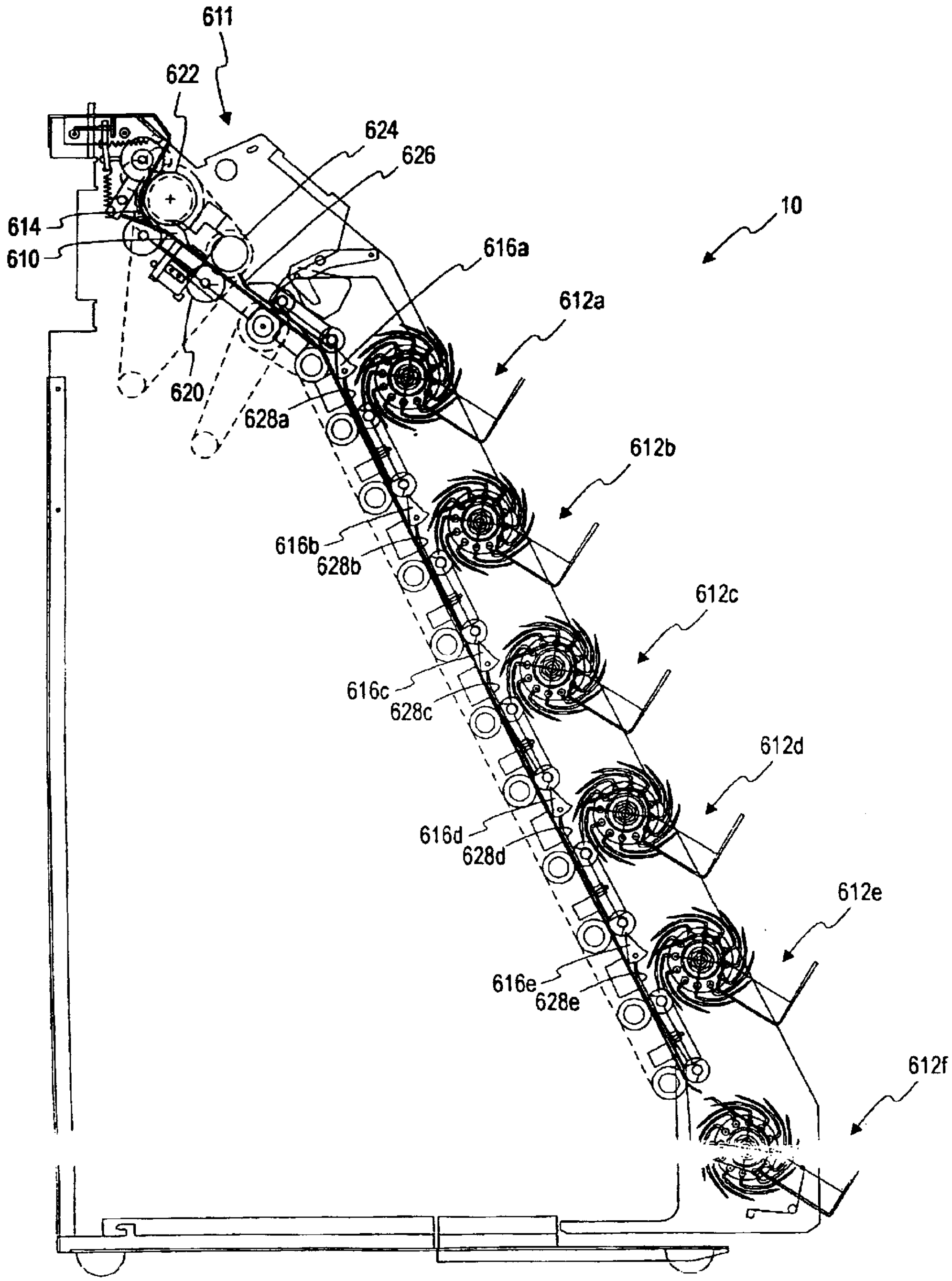
FIG. 20*c* depicts a six-pocket document handling device.

FIGS. 20*a*–20*c* depict multi-pocket document evaluation devices 10, such as a currency discriminators, according to other embodiments of the present invention. Although described in U.S. Pat. No. 6,311,819 B1, which is incorporated herein by reference in its entirety, the multi-pocket document handlers 10 of FIGS. 20*a*–20*c* are generally described below for convenience of the reader. FIG. 20*a* depicts a three-pocket document evaluation device 10, such as a currency discriminator. FIG. 20*b* depicts a four-pocket document evaluation device 10, such as a currency discriminator. FIG. 20*c* depicts a six-pocket document evaluation device 10, such as a currency discriminator.

The multi-pocket document evaluation devices 10 in FIGS. 20*a*–20*c* have a transport mechanism which includes a transport plate or guide plate 610 for guiding currency bills from input receptacle 611 to one of a plurality of output receptacles 612. The transport plate 610 according to one embodiment is substantially flat and linear without any protruding features. Before reaching the output receptacles 612, a bill can be, for example, evaluated, analyzed, authenticated, discriminated, counted and/or otherwise processed.

The multi-pocket document evaluation devices 10 move the currency bills in seriatim from the bottom of a stack of bills along a curved guideway 614 which receives bills moving downwardly and rearwardly and changes the direction of travel to a forward direction. An exit end of the curved guideway 614 directs the bills onto the transport plate 610 which carries the bills through an evaluation section and to one of the output receptacles 612. A plurality of diverters 616 direct the bills to the output receptacles 612. When a diverter 616 is in its lower position, bills are directed to the corresponding output receptacle 612. When a diverter 616 is in its upper position, bills proceed in the direction of the remaining output receptacles.

The multi-pocket document evaluation devices 10 of FIGS. 20*a*–20*c* according to one embodiment includes passive rolls 618, 620 which are mounted on an underside of the transport plate 610 and are biased into counter-rotating contact with their corresponding driven upper rolls 622 and 624. Other embodiments includes a plurality of follower plates which are substantially free from surface features and are substantially smooth like the transport plate 610. The follower plates 626 and 628 are positioned in spaced relation to transport plate 610 so as to define a currency pathway there between.

Additional Document Types

The fitness detection sensor(s) and methods disclosed can also be used to assess the fitness of documents other than currency bills. Accordingly, when describing various embodiments of the present invention, the term "currency bills" refers to official currency bills including both U.S. currency bills, such as a $1, $2, $5, $10, $20, $50, or $100 note, and foreign currency bills. Foreign currency bills are bank notes issued by a non-U.S. governmental agency as legal tender, such as a Euro, Japanese Yen, or British Pound note.

The term "currency documents" includes both currency bills and "substitute currency media." Examples of substitute currency media include without limitation, casino cashout tickets (also variously called cashout vouchers or coupons) such as "EZ Pay" tickets issued by International Gaming Technology or "Quicket" tickets issued by Casino Data Systems; casino script; promotional media such as Disney Dollars or Toys 'R Us "Geoffrey Dollars"; or retailer coupons, gift certificates, gift cards, or food stamps. Substitute currency media may include a barcode, and these types of substitute currency media are referred to herein as "barcoded tickets." Examples of barcoded tickets include casino cashout tickets such as "EZ Pay" tickets and "Quicket" cashout tickets, barcoded retailer coupons, barcoded gift certificates, or any other promotional media that includes a barcode. Although the invention embodiments refer to the "denomination" of currency bills as the criterion used in evaluating the currency bills, other predetermined criteria can be used to evaluate the currency bills, such as, for example, color size, and orientation. The term "non-currency documents" includes any type of document, except currency documents, that can be evaluated according to a predetermined criterion, such as color, size, shape, orientation, and so on.

"Substitute currency notes" are sheet-like documents similar to currency bills but are issued by non-governmental agencies such as casinos and amusement parks and include, for example, casino script and Disney Dollars. Substitute currency notes each have a denomination and an issuing entity associated therewith such as a $5 Disney Dollar, a $10 Disney Dollar, a $20 ABC Casino note and a $100 ABC Casino note. "Currency notes" consist of currency bills and substitute currency notes.

Additional Embodiments

A1. A currency handling device comprising a thickness detector, the detector comprising:

a first roller;

a second roller displaceably positioned relative to the first roller along a predetermined path in response to a note passing between the first roller and the second roller;

a roller gear coupled to and movable with the second roller;

a drive gear coupled to the roller gear, wherein the second roller is caused to roll by rotating the drive gear;

a sensor positioned to measure the relative displacement between the first roller and the second roller; and a processor coupled to the sensor and is programmed with software for determining a thickness associated with the note based on the relative displacement between the first and second rollers.

A2. A currency handling device comprising a thickness detector, the detector comprising:

a first roller;

a second roller mounted adjacent said first roller, second roller being mounted so as to permit it to move relative to the first roller when a bill passes between the first and second rollers;

a roller gear coupled to and movable with the second roller, a drive gear coupled to the roller gear, wherein the second roller is caused to roll by rotating the drive gear.

a sensor positioned to measure the relative displacement between the first roller and the second roller, and a processor coupled to the sensor and programmed with software for determining a thickness associated with the note based on the relative displacement between the first and second rollers.

A3. A document thickness detector comprising:

a first roller;

a second roller displaceably positioned relative to the first roller along a predetermined path in response to a document passing between the first roller and the second roller;

a roller gear coupled to and movable with the second roller;

a drive gear coupled to the roller gear, wherein the second roller is caused to roll by rotating the drive gear; and a sensor positioned to measure the relative displacement between the first roller and the second roller.

A4. The detector of any of Embodiments A1 or A3, wherein the predetermined path is an arc about the drive gear.

A5. The detector of Embodiment A4, wherein the roller gear is a planetary gear that travels in the arc about the drive gear.

A6. A document thickness detector comprising:

a first roller;

a second roller mounted adjacent said first roller, second roller being mounted so as to permit it to move relative to the first roller when a document passes between the first and second rollers;

a roller gear coupled to and movable with the second roller;

a drive gear coupled to the roller gear, wherein the second roller is caused to roll by rotating the drive gear; and a sensor positioned to measure the relative displacement between the first roller and the second roller.

A7. The detector of any of Embodiments A3–A6 further comprising a processor coupled to the sensor and programmed to determine a thickness associated with the document based on the relative displacement between the first and second rollers.

A8. The detector of Embodiment A7 wherein the processor is programmed with software to determine a thickness associated with the document based on the relative displacement between the first and second rollers.

A9. The detector of any of Embodiments A3–A6 further comprising firmware programmed to determine a thickness associated with the document based on the relative displacement between the first and second rollers.

A10. The detector of any of Embodiments A3–A9 wherein the document is a currency bill.

A11. The detector of any of Embodiments A1–A10, wherein the first roller rotates about a fixed axis.

A12. The detector of any of Embodiments A1–A11, wherein the sensor is a displacement sensor.

A13. The detector of Embodiment A12, wherein the displacement sensor is selected from the group consisting of linear voltage differential transducers and optical sensors.

A14. The detector of any of Embodiments A1–A13, wherein the sensor comprises a plurality of displacement sensors generally aligned along the second roller.

A15. The detector of any of Embodiments A1, A2 and A8, wherein the software for determining the thickness associated with a note comprises auto-zeroing software for recording a roller signature.

A16. A currency headlining device comprising a thickness detector, the detector comprising:

a first roller having a fixed central axis;

a first roller drive gear coupled to the first roller for causing the first roller to rotate;

a second roller having a displaceable central axis, wherein the second roller is positioned relative to the first roller such that passage of a note between the first roller and the second roller displaces the central axis of the second roller along a predetermined path, a planetary gear connected to the second roller and coaxial with the central axis of the second roller;

a second roller drive gear coupled to the planetary gear for causing the second roller to rotate, wherein the determined path along which the second roller may be displaced by the note is an arc about the second roller drive gear;

a sensor positioned to measure displacement between the first and second rollers; and a processor coupled to the sensor for determining thickness of a note based on displacement of the second roller along the predetermined path.

A17. A thickness detector comprising:

a first roller having a fixed central axis;

a first roller drive gear coupled to the first roller for causing the first roller to rotate, a second roller having a displaceable central axis, wherein the second roller is positioned relative to the first roller such that passage of a note between the first roller and the second roller displaces the central axis of the second roller along a predetermined path, a planetary gear connected to the second roller and coaxial with the central axis of the second roller;

a second roller drive gear coupled to the planetary gear for causing the second roller to rotate, wherein the determined path along which the second roller may be displaced by the note is an arc about the second roller drive gear; and a sensor positioned to measure displacement between the first and second rollers.

A18. The detector of Embodiment A17 further comprising a processor coupled to the sensor for determining thickness of a note based on displacement of the second roller along the predetermined path.

A19. The detector of any Embodiments A16–A18, wherein the sensor and processor are integrated in a displacement sensor.

A20. The detector of any of Embodiments A16–A19, wherein the rollers are elongated.

A21. The detector of any of Embodiments A16–A20, wherein the rollers are between 4 and 10 inches long.

A22. The detector of any of Embodiments A16–A21, wherein the rollers are full-width rollers.

A23. The detector of any of Embodiments A16–A22, wherein the rollers comprise a ground and a hardened stainless steel surface.

A24. The detector of any of Embodiments A16–A23, wherein the processor is programmed with software for detecting presence, size and locations of items on or in the note.

A25. The detector of Embodiment A24 wherein a note is determined to be unfit based on the items detected exceeding a predetermined size threshold.

A26. The detector of Embodiment A24 or A25, wherein the size threshold is based on area of the bill.

A27. The detector of any of Embodiments A16–A24 wherein a note is determined to be unfit if the measured displacement exceeds a predetermined size threshold.

A28. The detector of Embodiment A16 or A18, wherein the processor is programmed to detect discontinuities in notes, and doubles and chains of notes.

A29. The detector of Embodiment A28, wherein a discontinuity detected is from the group consisting of folds, bends, and threads.

A30. A method of determining thickness associated with a note, the method comprising:

passing a note between a pair of rollers, allowing the note to displace at least one of the rollers;

restricting displacement of the one roller to a predetermined arced path;

measuring displacement of the one roller; and determining a thickness associated with the note based on the displacement of the one roller.

A31. A method of determining thickness associated with a note, the method comprising:

passing a note between a pair of rollers, wherein the passing of a note between the pair of rollers causes relative displacement between the rollers; and measuring the relative displacement between the rollers; and determining a thickness associated with the note based on the relative displacement.

A32. A method of determining thickness associated with a note, the method comprising:

passing a note between a pair of rollers;

allowing the note to relatively displace the rollers from each other;

restricting the relative displacement of the rollers to a predetermined arced path;

measuring relative displacement of the rollers; and determining a thickness associated with the note based on the measured relative displacement of the rollers.

A33. The method of any of Embodiments A30–A32, comprising driving both rollers to pass the note between the rollers.

A34. A currency handling device comprising a limpness detector, the detector comprising:

deforming structure having a predetermined shape for deforming a note;

complimentary structure conforming to the deforming structure, wherein the note is passed between the deforming structure and the complimentary structure and the predetermined shape causes the note to be deformed about two transverse axes; and a microphone operably positioned to detect noise produced by deforming the note.

A35. A document limpness detector comprising:

deforming structure having a predetermined shape for deforming a document;

complimentary structure conforming to the deforming structure, wherein the document is passed between the deforming structure and the complimentary structure and the predetermined shape causes the document to be deformed about two transverse axes; and a microphone operably positioned to detect noise produced by deforming the document.

A36. The detector of any of Embodiments A34–35, wherein the two transverse axes are perpendicular to one another.

A37. The detector of any of Embodiments A34–A36, wherein the deforming structure comprises a roller having the predetermined shape and the complimentary structure comprises a belt.

A38. The detector of Embodiment A37 wherein the belt rotates in response to interaction with the roller.

A39. The detector of any of Embodiments A34–A38, wherein the deforming structure and complimentary structure are operably spaced to deform a single document.

A40. The detector of any of Embodiments A34–A38, wherein the deforming structure and complimentary structure are operably spaced to break a brick pack of notes.

A41. A currency handling device comprising a limpness detector, the detector comprising:

deforming structure having a predetermined shape for deforming a note;

complimentary structure conforming to the deforming structure, wherein the note is passed between the deforming structure and the complimentary structure and the predetermined shape causes the note to be deformed about two or more parallel axes; and a microphone operably positioned to detect noise produced by deforming the note.

A42. A limpness detector comprising:

deforming structure having a predetermined shape for deforming a document;

complimentary structure conforming to the deforming structure, wherein the document is passed between the deforming structure and the complimentary structure and the predetermined shape causes the document to be deformed about two or more parallel axes, and a microphone operably positioned to detect noise produced by deforming the document.

A43. The detector of any of Embodiments A41–A42, wherein the deforming structure deforms the note about an axis transverse to the two or more parallel axes.

A44. The detector of any of Embodiments A34–A43, wherein the deforming structure comprises (guides to facilitate deforming the bill.

A45. The detector of any of Embodiments A34–A44, comprising guides positioned to facilitate feeding the bill.

A46. The detector of Embodiment A45, wherein the guides are positioned to deform the bill.

A47. A currency handling device comprising a limpness detector, the detector comprising:

a roller comprising:

a central bulge;

a first outer bulge extending radially further than the central bulge; and a second outer bulge spaced apart from the first outer bulge extending radially further than the central bulge, wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein a note is passed between the belt and the roller to deform the note; and a microphone operably positioned to detect sound produced by deforming the note.

A48. A currency handling device comprising a limpness detector, the detector comprising:

a roller comprising:

a central bulge;

a first outer bulge extending radially further than the central bulge; and a second outer bulge spaced apart from the first outer bulge extending radially further than the central bulge wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein a belt and roller are adapted to permit a note to pass therebetween; and a microphone operably positioned to detect sound produced by deforming the note.

A49. A currency handling device comprising a limpness detector, the detector comprising:

a roller comprising:

a central bulge, a first outer bulge extending radially further than the central bulge; and a second outer bulge spaced apart from the first outer bulge extending radially further than the central bulge, wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein belt and roller define a note transport path therebetween; and a microphone operably positioned to detect sound produced by deforming the note.

A50. A document limpness detector comprising:

a roller comprising:

a central bulge;

a first outer bulge extending radially further than the central bulge; and a second outer bulge spaced apart from the first outer bulge extending radially further than the central bulge, wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein a document is passed between the belt and the roller to deform the document; and a microphone operably positioned to detect sound produced by deforming the document.

A51. A document limpness detector comprising:

a roller comprising:

a central bulge;

a first outer bulge extending radially further than the central bulge, and a second outer bulge spaced apart from the first outer bulge extending radially further than the central bulge, wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein a belt and roller are adapted to permit a document to pass therebetween; and a microphone operably positioned to detect sound produced by deforming the document.

A52. A document limpness detector comprising:

a roller comprising:

a central bulge;

a first outer bulge extending radially further than the central bulge; and a second outer bulge spaced apart from the first outer bulge extending radially further than the central bulge, wherein the central bulge is positioned axially between the first and second outer bulges; and a belt conforming to the central bulge of the roller, wherein the central bulge has a circumference and the belt conforms to the central bulge over at least about ⅛ the circumference of the central bulge and wherein belt and roller define a document transport path therebetween; and a microphone operably positioned to detect sound produced by deforming the document.

A53. The limpness detector of any of Embodiments A47–A52, comprising first and second guides positioned proximate to the first bulge and the second bulge, respectively, wherein the central bulge is positioned between the guides and the note is passed under the guides and over the outer bulges.

A54. The limpness detector of Embodiment A53, wherein the first and second guides are connected.

A55. The limpness detector of Embodiment A53, wherein the outer bulges are positioned between the guides.

A56. The limpness detector of Embodiment A55, wherein the guides comprise upper and lower members and the bill is passed between the upper and lower members.

A57. The limpness detector of any of Embodiments A53–A56, wherein the outer bulges extend radially beyond the guides.

A58. The limpness detector of any of Embodiments A47–A57, wherein the roller is driven.

A59. The limpness detector of any of Embodiments A47–A58, wherein the belt is driven.

A60. A currency handling device comprising a limpness detector, the detector comprising:

means for deforming a note about three axes, wherein at least two of the three axes are in parallel relation; and a microphone operably positioned to detect noise produced by deforming the note.

A61. A document limpness detector comprising:

means for deforming a document about three axes, wherein at least two of the three axes are in parallel relation; and a microphone operably positioned to detect noise produced by deforming the document.

A62. The detector of any of Embodiments A60–A61, wherein all three axes are in parallel relation.

A63. The detector of Embodiment A62, wherein the means for deforming the note comprises means for deforming the note about an axis transverse to the three axes in parallel relation.

A64. A currency handling device comprising a limpness detector, the detector comprising:

means for deforming a note about two axes in transverse, the means comprising a single belt contacting the note; and a microphone operably positioned to detect noise produced by deforming the note.

A65. A document limpness detector comprising:

means for deforming a document about two axes in transverse, the means comprising a single belt contacting the note; and a microphone operably positioned to detect noise produced by deforming the document.

A66. A currency evaluation device for receiving a stack of currents bills and rapidly evaluating the bills in the stack, the device comprising:

an input receptacle adapted to receive a stack of currency bills to be evaluated;

one or more output receptacles adapted to receive the bills after the bills have been evaluated;

a transport mechanism adapted to transport the bills, one at a time, from the input receptacle to the one or more output receptacles along a transport path;

one or more of the detectors of any of Embodiments A1–A65.

A67. The device of Embodiment A66 wherein the transport mechanism is adapted to transport bills at a rate in excess of about 800 bills per minute.

A68. The device of Embodiment A66 wherein the transport mechanism is adapted to transport bills at a rate in excess of about 1000 bills per minute.

A69. The device of Embodiment A66 wherein the transport mechanism is adapted to transport bills at a rate in excess of about 1200 bills per minute.

A70. A method of handling currency, the method comprising:

deforming a note with a single roller, including deforming the note about at least two axes, detecting sound produced by deforming the note; and making a determination concerning the note based on sound detected.

A71. The method of Embodiment A70, comprising guiding the note in relation to the single roller with sheet metal guides.

A72. The method of Embodiment A70, comprising transporting the note between the single roller and a belt conforming to the single roller.

A73. A currency handling method comprising:

passing a bill past a scanner;

taking a bit-map image of the bill with the scanner;

determining denomination of the bill based on the bit-map image;

determining orientation of the bill based on the bit-map image; and determining soil level of the bill based on the bit-map image.

A74. A method of determining the fitness of currency comprising:

passing a bill past a scanner;

taking an image of the bill with the scanner;

determining soil level of the bill based on the image.

A75. A method of determining the fitness of currency comprising:

passing a bill past a sensor;

generating an image signal in response to the bill passing the sensor;

determining soil level of the bill based on the image signal.

A76. The method of any of Embodiments A73–A75, wherein determining the soil level is based on contrast techniques.

A77. The method of any of Embodiments A73–A75, wherein determining the soil level is based on brightness techniques.

A78. The method of any of Embodiments A73–A75, wherein determining the soil level is based on brightness and contrast techniques.

A79. The method of any of Embodiments A73–A78, wherein determining soil level of the bill based on the image is based on analyzing patterns of the bill.

A80. The method of Embodiment A79, wherein the patterns to be analyzed are determined based on the determined denomination of the bill and the determined orientation of the bill.

A81. The method of Embodiment A73, comprising determining the soil level after determining the denomination of the bill and the orientation of the bill.

A82. A currency handling apparatus comprising:

an input pocket;

one or more output pockets;

a transport mechanism connecting the input pocket to the one or more output pockets;

a scanner operatively positioned relative to the transport mechanism such that a bill transported by the transport mechanism passes the scanner, wherein the scanner is adapted to take a bit-map image of the bill;

a processor coupled to the scanner, wherein the processor comprises programming steps for:

determining denomination of the bill based on the bit-map image, determining orientation of the bill based on the bit-map image, and determining soil level of the bill based on the bit-map image.

A83. A currency handling apparatus comprising:

an input pocket;

two output pockets;

a transport mechanism connecting the input pocket to the two output pockets;

a scanner operatively positioned relative to the transport mechanism such that a bill transported by the transport mechanism passes the scanner, wherein the scanner is adapted to take a bit-map image of the bill;

a processor coupled to the scanner, wherein the processor comprises programming steps for:

determining denomination of the bill based on the bit-map image, determining orientation of the bill based on the bit-map image, and determining soil level of the bill based on the bit-map image.

A84. The apparatus of any of Embodiments A82–A83, wherein the processor comprises programming steps for determining soil level of the bill based on a comparison of one of a predetermined plurality of patterns of the bit-map image with a corresponding stored pattern and wherein the one of a predetermined plurality of patterns is selected based on the determined denomination of the bill and the determined orientation of the bill.

A85. A currency handling apparatus comprising:

an input pocket;

four or more output pockets;

a transport mechanism connecting the input pocket to the four or more output pockets;

a scanner operatively positioned relative to the transport mechanism such that a bill transported by the transport mechanism passes the scanner, wherein the scanner is adapted to take a bit-map image of the bill;

a processor coupled to the scanner, wherein the processor comprises programming steps for:

determining denomination of the bill based on the bit-map image, determining orientation of the bill based on the bit-map image, and determining soil level of the bill based on the bit-map image.

A86. A currency handling apparatus comprising:

an input pocket;

one or more output pockets;

a transport mechanism connecting the input pocket to the one or more output pockets;

a sensor operatively positioned relative to the transport mechanism such that a bill transported by the transport mechanism passes the sensor, wherein the sensor is adapted to retrieve image information from the bill;

a processor coupled to the sensor and programmed to determine soil level of the bill based on the image information.

A87. A currency handling apparatus comprising:

an input pocket;

two output pockets;

a transport mechanism connecting the input pocket to the two output pockets;

a sensor operatively positioned relative to the transport mechanism such that a bill transported by the transport mechanism passes the sensor, wherein the sensor is adapted to retrieve image information from the bill; and a processor coupled to the sensor and programmed to determine soil level of the bill based on the image information.

A88. The apparatus of any of Embodiments A86–A87, wherein the processor comprises programming steps for determining soil level of the bill based on a comparison of one of a predetermined plurality of patterns of the image information with a corresponding stored pattern and wherein the one of a predetermined plurality of patterns is selected based on a determined denomination of the bill and a determined orientation of the bill.

A89. A currency handling apparatus comprising:

an input pocket, four or more output pockets;

a transport mechanism connecting the input pocket to the four or more output pockets;

a sensor operatively positioned relative to the transport mechanism such that a bill transported by the transport mechanism passes the sensor, wherein the sensor is adapted to retrieve image information from the bill;

a processor coupled to the sensor and programmed to determine soil level of the bill based on the image information.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary the intention is to cover all modifications, equivalents, and alternatives falling within the spirit and scope of the invention as defined by the appended claims.

What is claimed:

1. A currency handling method comprising:

passing a bill past a scanner;

taking a bit-map image of the bill with the scanner;

determining denomination of the bill based on the bit-map image;

determining orientation of the bill based on the bit-map image; and determining soil level of the bill based on the bit-map image.

2. The method of claim 1, wherein determining the soil level is based on contrast techniques.

3. The method of claim 1, wherein determining the soil level is based on brightness techniques.

4. The method of claim 1, wherein determining the soil level is based on brightness and contrast techniques.

5. The method of claim 1, wherein determining soil level of the bill based on the bit-map image is based on analyzing patterns of the bill.

6. The method of claim 5, wherein the patterns to be analyzed are determined based on the determined denomination of the bill and the determined orientation of the bill.

7. The method of claim 1, comprising determining the soil level after determining the denomination of the bill and the orientation of the bill.

8. A currency handling apparatus comprising:

an input pocket;

two output pockets;

a transport mechanism connecting the input pocket to the two output pockets;

a scanner operatively positioned relative to the transport mechanism such that a bill transported by the transport mechanism passes the scanner, wherein the scanner is adapted to take a bit-map image of the bill;

a processor coupled to the scanner, wherein the processor comprises programming steps for:

determining denomination of the bill based on the bit-map image, determining orientation of the bill based on the bit-map image, and determining soil level of the bill based on the bit-map image.

9. The apparatus of claim 8, wherein the processor comprises programming steps for determining soil level of the bill based on a comparison of one of a predetermined plurality of patterns of the bit-map image with a corresponding pattern stored in the processor and wherein the one of a predetermined plurality of patterns is selected based on the determined denomination of the bill and the determined orientation of the bill.

10. A currency handling apparatus comprising:

an input pocket;

four or more output pockets;

a transport mechanism connecting the input pocket to the four or more output pockets;

a scanner operatively positioned relative to the transport mechanism such that a bill transported by the transport mechanism passes the scanner, wherein the scanner is adapted to take a bit-map image of the bill;

a processor coupled to the scanner, wherein the processor comprises programming steps for:

determining denomination of the bill based on the bit-map image, determining orientation of the bill based on the bit-map image, and determining soil level of the bill based on the bit-map image.

* * * * *